United States Patent [19]
Shokaku et al.

[11] Patent Number: 6,044,778
[45] Date of Patent: Apr. 4, 2000

[54] METHOD AND DEVICE FOR PICKING UP SEEDLINGS FROM SEEDLING TRAY

[75] Inventors: Michihiro Shokaku; Isao Mikawa; Masayuki Kaji; Nobuhiro Yamamoto; Makoto Matsuda, all of Hokkaido, Japan

[73] Assignee: Circle Tekko Co., Ltd., Hokkaido, Japan

[21] Appl. No.: 09/006,882

[22] Filed: Jan. 14, 1998

[30] Foreign Application Priority Data

Sep. 8, 1997 [JP] Japan ................................. 9-257927

[51] Int. Cl.⁷ .................................................. A01C 11/00
[52] U.S. Cl. ............................. 111/105; 414/417; 47/901
[58] Field of Search ................................. 111/105, 104, 111/101, 106, 200, 115; 414/404, 406, 408, 416, 417, 502, 518; 47/901, 101 R

[56] References Cited

U.S. PATENT DOCUMENTS

| | | | |
|---|---|---|---|
| 4,593,632 | 6/1986 | Mikawa et al. | 111/105 |
| 5,596,938 | 1/1997 | Shaw | 111/105 |
| 5,644,999 | 7/1997 | Williames | 111/105 |
| 5,676,072 | 10/1997 | Williames | 47/901 X |
| 5,784,984 | 7/1998 | Mikawa | 111/105 |
| 5,860,372 | 1/1999 | Bouldin et al. | 111/105 |
| 5,868,086 | 2/1999 | Williames | 111/105 |

FOREIGN PATENT DOCUMENTS 7-184421  7/1995  Japan ............................ A01C 11/02

*Primary Examiner*—Victor Batson
*Attorney, Agent, or Firm*—Sughrue, Mion, Zinn Macpeak & Seas, PLLC

[57] ABSTRACT

A method and a device for picking up seedlings from a seedling tray is capable of picking up seedlings by accurately arranging seedling storage cells in opposition to seedling pushing rods irrespective of the transporting tilt of the seedling tray. In the method, the seedling tray formed with a plurality of seedling storage cells is positioned at a predetermined position by means of tray positioning rods, and the seedling pushing rods are inserted into respective seedling storage cells while maintaining the positioned condition. The device implementing the method includes the tray positioning rods for positioning the seedling tray at the predetermined position and the seedling pushing rods for performing an inserting operation for respective seedling storage cells while maintaining the positioned condition of the seedling tray by the tray positioning rods.

33 Claims, 21 Drawing Sheets

METHOD AND DEVICE FOR PICKING UP SEEDLINGS FROM SEEDLING TRAY

BACKGROUND OF THE INVENTION

1. Field of the Invention

The present invention relates to a method and a device for picking up a seedling from a seedling tray, and more particularly, for picking up a seedling from a plurality of seedling storage cells formed in a seedling tray.

2. Description of the Related Art

An example of a conventional seedling picking up device for a seedling tray, is disclosed in Japanese Unexamined Patent Publication No. Heisei 7 (1995)-184421.

As shown in FIG. 21, the conventional seedling tray transporting apparatus is constructed with a seedling tray 113, in which a plurality of seedling storage cells 112 are embossed in a sheet form tray body 111, and a transporting member 115 transversely extending between a pair of transporting strips 114, 114 (only one is shown), is inserted between adjacent seedling storage cells 112, 112. The pair of transporting strips 114, 114 are intermittently driven at a predetermined pitch for driving the seedling storage cells 112 by the transporting member 115 to stop each of the seedling storage cells at a predetermined seedling picking up position, at which a seedling picking up claw 116 is disposed.

However, the conventional device encounters the following problems.

(1) With respect to the seedling tray, in addition to a sheet type, in which a plurality of seedling storage cells 112 are embossed, as set forth above, there is a board type, in which a plurality of seedling storage cells recessed in a board form a tray body.

In the conventional transporting device, in which the seedling storage cells 112 are pushed by the transporting member 115 inserted between adjacent seedling storage cells 112, it is not possible to transport the board type cell having a flat bottom surface.

(2) When another sheet type seedling tray which differentiates in the arrangement pitch and the size of the seedling storage cells, is used, it is not possible to register the seedling storage cell to the predetermined seedling picking up position unless the traveling pitch of the transporting strips 114, 114 is significantly altered. Therefore, a complicated exchanging operation becomes necessary when using different types of seedling trays, resulting in a lowering work efficiency.

It is desirable to enable picking-up of the seedling by stopping the seedling storage cell at a predetermined seedling pick-up position even when the arrangement pitches of the seedling storage cells and the sizes are different in the seedling storage cells or the types of the seedling trays are different, such as between the sheet type, board type and so forth. This can be achieved by an apparatus which detects the front end face of the seedling tray in the transporting direction by a tray detecting sensor to stop the first row of the seedling storage cells in the seedling tray at the seedling pick-up position, subsequently calculating a transporting distance of the seedling tray from the detected position of the front end face of the seedling tray in the transporting direction by the tray detection sensor, making judgment whether the calculated transporting distance matches with the arrangement pitch so that the seedling tray is stopped every time when a matching of the transporting distance and the predetermined arrangement pitch of the seedling storage cells is reached and whereby each row of the seedling storage cells are stopped at the seedling pick-up position.

However, in the foregoing transporting device of the seedling tray, irrespective of the actual transporting distance of the seedling tray, the seedling tray is stopped when the arithmetically calculated transporting distance matches with the predetermined pitch. Therefore, it is possible that the actual transporting distance and the calculated transporting distance become inconsistent due to accumulated error of a measured value which is used as a reference in calculation of the transporting distance or a play in the transporting mechanism portion of the seedling tray.

In such a case, the position of the seedling pushing rod and the rod insertion hole in the bottom portion of the seedling storage cells of the seedling tray cause an offset of insertion of the seedling pushing rod into the seedling storage cells and thus make it impossible to pick-up the seedling from the seedling tray.

In addition, in the transporting path of the seedling tray, it is typical to arrange a guide rail or the like so that the seedling tray may travel in straight. However, in a certain setting of the gap between the guide rail and the seedling tray, the seedling tray may be transported in a tilted manner. In such a case, the seedling pushing rod and the rod insertion hole in the bottom portion of the seedling storage cells of the seedling tray become offset to each other to make it impossible to pick-up the seedling from the seedling tray. Also, transportation of the seedling tray in the tilted manner can be caused when the tray is worn or deformed.

SUMMARY OF THE INVENTION

Therefore, it is an object of the present invention to provide a method and a device for picking-up seedlings from a seedling tray which can establish opposing position of a seeding storage cells and a seedling pushing rod irrespective of a tilted transporting manner of the seedling tray and even when wearing or deformation is caused on the seedling tray.

According to the present invention, a method for picking up seedlings from a seedling tray is characterized by positioning a seedling tray, in which a plurality of seedling storage cells are formed, at a predetermined position by tray positioning rods, and performing insertion of seedling pushing rods in the positioned condition of the seedling tray.

According to the present invention, a device for picking up seedlings from a seedling tray comprises tray positioning rods for positioning the seedling tray at the predetermined position and seedling pushing rods to be inserted into respective seedling storage cells while maintaining the seedling tray at the predetermined position.

According to the first aspect of the invention, a method for picking up seedlings from a seedling tray, for picking up the seedlings by inserting a seedling pushing rods into rod insertion holes formed in bottoms of respective of seedling storage cells per each row of the seedling storage cells formed in alignment at a predetermined pitch in the seedling tray transported in one direction, comprises the steps of:

positioning the seedling tray at a predetermined position by means of a tray positioning rod; and inserting the seedling pushing rods while maintaining the seedling tray in the positioned condition.

According to the present invention, the seedling can be picked up by accurately opposing the seedling storage cells and the seedling pushing rods even when the seedling tray is transported in a tilted fashion and furthermore even when wearing or deformation is caused in the seedling tray.

In the preferred construction, the tray positioning rods may be inserted into some of the seedling storage cells in a row rather than inserting the seedling pushing rods into a row of the seedling storage cells.

The seedling tray may be positioned by inserting the tray positioning rod into some of the seedling storage cells in the Nth row and the seedling pushing rods into the seedling storage cells in the (N+1)th row.

The seedling tray may be positioned by inserting the tray positioning rod into some of the seedling storage cells in the Nth row, the tray positioning rod being moved in a magnitude corresponding to an arrangement pitch of the seedling storage cells, toward downstream in a transporting direction of the seedling tray while maintaining the condition where the tray positioning rod is inserted into some of the seedling storage cells, and the seedling pushing rods are inserted into respective of the seedling storage cells in the (N+1)th row. The seedling tray may be positioned by abutting the tray positioning rod to a front end face of the seedling tray, the seedling pushing rods being inserted into respective of the seedling storage cells in a Nth row for picking up the seedling stored therein, subsequently, the seedling tray is positioned by inserting the tray positioning rod into some of the seedling storage cells in Nth row, the tray positioning rod is moved in a magnitude corresponding to an arrangement pitch of the seedling storage cells, toward downstream in a transporting direction of the seedling tray while maintaining the condition where the tray positioning rod is inserted into some of the seedling storage cells, and the seedling pushing rods are inserted into respective seedling storage cells in the (N+1)th row. A plurality of tray positioning holes to be inserted by the tray position rod are in alignment at predetermined interval, and may be formed in the seedling tray, and the seedling tray is positioned by inserting the tray positioning rod in the tray positioning hole. The tray positioning rod may be shifted in the magnitude corresponding to the arrangement pitch of the seedling storage cells toward the downstream side of a transporting direction of the seedling tray while maintaining a condition where the tray positioning rod is inserted in some of the tray positioning holes, and then insertion of the seedling pushing rods into the seedling storage cells is performed.

With the construction set forth above, the seedling tray can be transported by a predetermined arrangement pitch. Also, it is not necessary to position the seedling tray after one transport for the predetermined arrangement pitch. Furthermore, the front end face of the seedling tray abuts the tray positioning rod to initially position the seedling tray accurately. On the other hand, in the alternative construction set forth above, the dedicated tray positioning holes are formed so that the tray positioning rods are inserted into the dedicated tray positioning holes without inserting the same into opening the bottom of the seedling storage cells. Therefore, the seedling tray or the seedling storage cells may not be damaged by the tray positioning rods during seedling pick-up operation.

The method further comprises seedling holding needles to be downwardly shifted into the seedling storage cells from an upper surface opening thereof for piercing and holding the seedling stored in the seedling storage cells by the seedling holding needles, then, the seedling pushing rods are elevated upwardly to abut onto the bottom surface of the seedling pierced and held by the seeding holding needles under pressure for pushing up the seedling by elevating the seedling holding needles and the seedling pushing rods at the same speed.

With the construction set forth above, it becomes possible to prevent drop out of the seedling pierced by the seedling holding needle. Furthermore, since the seedlings are pierced while stored in the seedling storage cells, the seedling can be pierced while maintaining the upright position.

According to the second aspect of the invention, a device for picking up seedlings from a seedling tray, for picking up the seedlings per each row of the seedling storage cells formed in alignment at a predetermined pitch in the seedling tray transported in one direction, comprises:

a tray positioning rod for positioning the seedling tray from which the seedlings stored in the respective seedling storage cells are to be picked up; and seedling pushing rods performing an insertion operation for respective seedling storage cells while maintaining a condition where the seedling tray is positioned at a predetermined position by the tray positioning rod.

According to the third aspect of the invention, a device for picking up seedlings from a seedling tray, for picking up the seedlings per each row of the seedling storage cells formed in alignment at a predetermined pitch in the seedling tray transported in one direction, comprises:

a tray positioning rod being inserted into some of the seedling storage cells in a row other than a row of the seedling storage cells, to which the seedling pushing rods are inserted, for positioning the seedling tray from which the seedlings stored in the respective seedling storage cells are to be picked up; and seedling pushing rods performing an insertion operation for the respective seedling storage cells while maintaining a condition where the seedling tray is positioned at a predetermined position by inserting the tray positioning rod into some of the seedling storage cells.

According to the fourth aspect of the present invention, a device for picking up seedlings from a seedling tray, for picking up the seedlings per each row of the seedling storage cells formed in alignment at a predetermined pitch in the seedling tray transported in one direction, comprises:

a tray positioning rod being inserted into some of the seedling storage cells in a Nth row, for positioning the seedling tray from which the seedlings stored in the respective seedling storage cells are to be picked up; and seedling pushing rods performing an insertion operation for respective seedling storage cells in (N+1)th row while maintaining a condition where the seedling tray is positioned at a predetermined position by inserting the tray positioning rod into some of the seedling storage cells in the Nth row.

According to the second to fourth aspect of the present invention, the same effect as that of the first aspect of the invention can be achieved.

The device may further comprise a tray transporting device intermittently transporting the seedling tray by shifting in the magnitude corresponding to arrangement pitch of the seedling storage cells toward downstream side in the transporting direction of the seedling tray while maintaining the condition where the tray positioning rod is inserted into some of the seedling storage cells in the seedling tray. The tray position rod and the seedling pushing rods may be arranged with an interval corresponding to the arrangement pitch of the seedling storage cells. The tray positioning rod and the seedling pushing rods may be simultaneously shifted while maintaining a constant interval between each other in the transporting direction of the seedling tray, and shifted in a vertical direction independently of each other. The device may further comprise two link mechanisms supporting the tray positioning rod and the seedling pushing rods in vertically movable fashion independently of the other, a seedling pushing mechanism provided in each link mechanism and constituted of a fluid pressure cylinder, and a tray transporting driving portion reciprocally shifting the seedling pushing mechanism at the same stroke as the arrangement pitch of the seedling storage cell in the transporting direction of the seedling tray.

By positioning the seedling tray by means of the tray positioning rod, the seedling pushing rods may be opposed to the seedling storage cells. By this, the mechanism for positioning the seedling tray can be simplified to shorten the period required for positioning.

The tray positioning rod may be arranged at a position opposing the seedling storage cell arranged at the most outside of the seedling storage cell in the row of cells.

The tray positioning rod is inserted into the seedling storage cells arranged at the outermost position of the seedling storage cells to simplify the construction while assuring positioning.

According to the fifth aspect of the invention, a device for picking up seedlings from a seedling tray, for picking up the seedlings per each row of the seedling storage cells formed in alignment at a predetermined pitch in the seedling tray transported in one direction, comprises:

a plurality of positioning rod insertion holes formed in the seedling tray in parallel to a transporting direction of the seedling tray and in alignment with a predetermined interval;

tray positioning rods to be inserted into some of the positioning rod insertion holes for positioning the seedling tray; and seedling pushing rods performing an insertion operation for respective seedling storage cells while maintaining the condition where the tray position rods are inserted into some of the positioning rod insertion holes for positioning.

The tray positioning holes to be inserted by the tray positioning rods are formed instead of opening the bottom portions of the seedling storage cells. Therefore, reducing the possibility of damaging the thin bottom portion of the seedling storage cells as in the case where the tray positioning rods are inserted into the openings formed in the bottom portion of the seedling tray having thin wall thickness.

The device may further comprise a tray transporting device intermittently transporting the seedling tray by shifting in the magnitude corresponding to arrangement pitch of the seedling storage cells toward the downstream side in the transporting direction of the seedling tray while maintaining the condition where the tray positioning rod is inserted into some of the positioning rod insertion holes.

The positioning rod insertion holes may be formed in alignment with an interval corresponding to the arrangement pitch of the seedling storage cells.

The positioning rod may have a tip end portion formed into a cone shaped configuration, and an intermediate portion following to the tip end portion, which intermediate portion has an external diameter matching with an internal diameter of the positioning rod insertion hole.

With the construction set forth above, even when the seedling tray is slightly offset, the seedling tray can be accurately positioned by correcting the offset associated with insertion of the tray positioning rod into the rod insertion hole as long as the tip end of the tray positioning rod is placed in opposition with the rod insertion hole.

Furthermore, since the intermediate portion of the tray positioning rod is provided with the external diameter corresponding to the internal diameter of the rod insertion hole, positioning of the seeding tray can be accurate.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
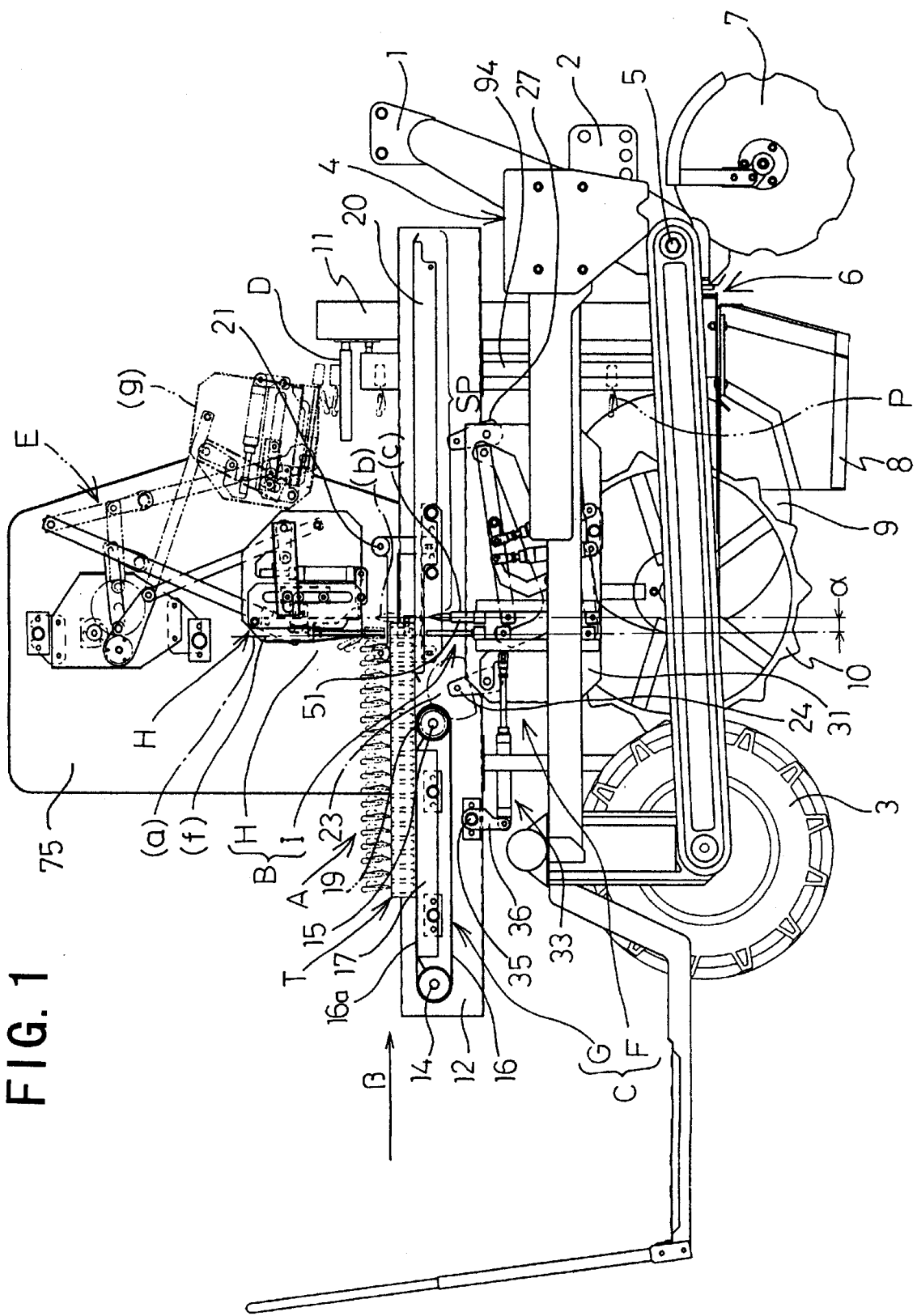
FIG. 1 is a side elevation of a seedling transplantation machine, in which the preferred embodiment of a seedling picking-up device from a seeding tray according to the present invention is installed.
Figure 2:
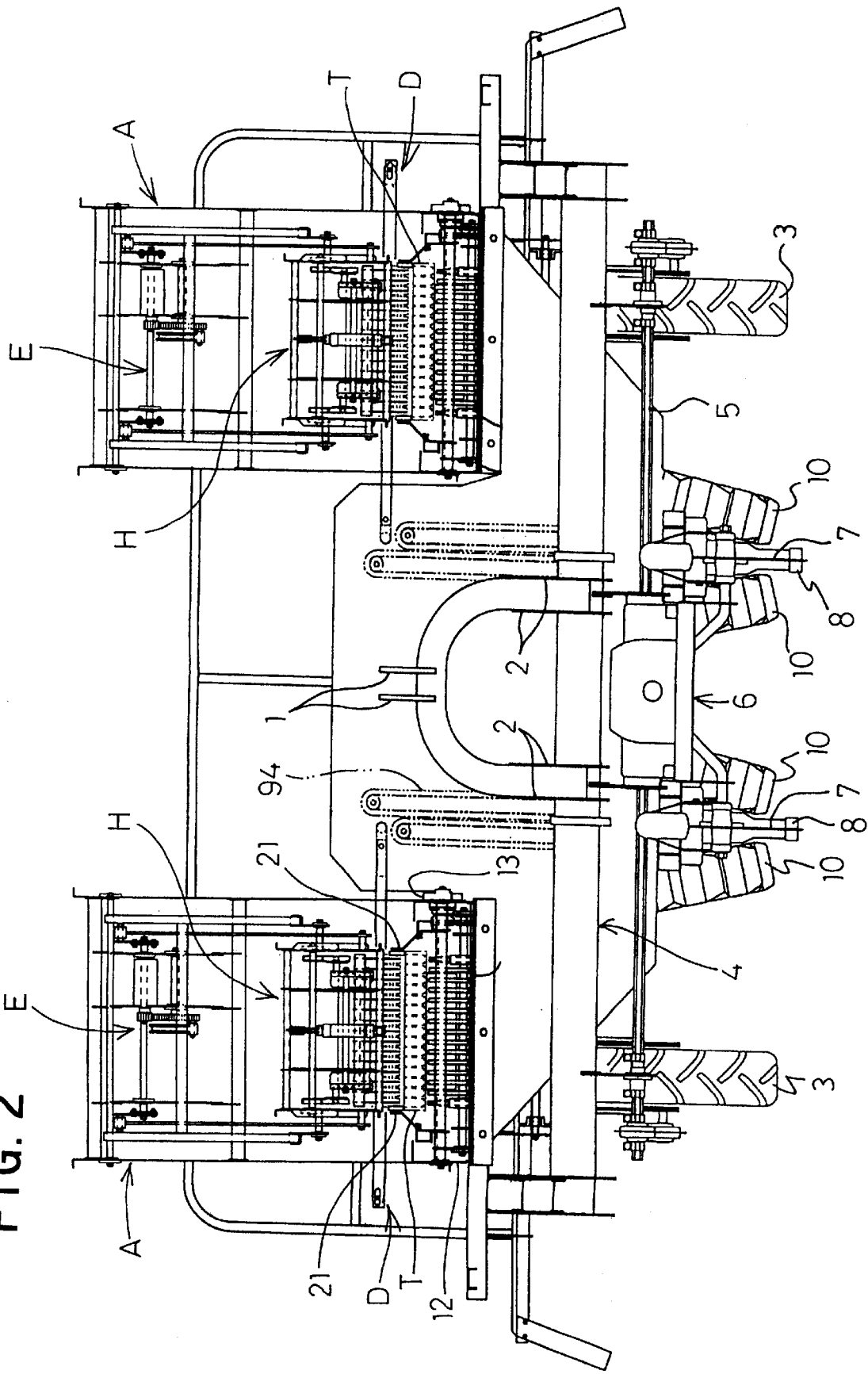
FIG. 2 is a front elevation of the seedling transplantation machine of FIG. 1.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. On the other hand, well-known structures are not shown in detail in order to avoid unnecessarily obscuring the present invention.

Hereinafter, the preferred embodiment of a seedling pick-up device for picking-up a seedling from a seedling tray, according to the present invention will be discussed together with general construction of a seedling transplantation machine installed the same.

The transplantation machine includes a main frame 4 frontwardly projecting upper and lower connecting pieces 1 and 2 for connection with a tractor (not shown) and driving wheels 3 at the rear side, and a movable frame 6 vertically pivotable about a driving shaft 5 transversely extended on the front side of the main frame 4. On the movable frame 6, rolling coulters 7, 7 for cutting foreign matter, openers 8, 8 for forming ridge grooves, seedling planting wheels 9, 9 for planting seedlings P in the ridge grooves and two sets of press down wheels 10, 10 for pressing down the planted seedlings P are arranged in sequential order from the front side to the back side of the movable frame. A pair of left and right seedling supply units A, A for respectively supplying seedlings to the seedling planting wheels 9, 9 are also mounted on the movable frame 6.

The seedling supply unit A is constructed with the preferred embodiment of the seedling pick-up device according to the present invention for picking up seedlings P from the seedling tray T, a tray transporting device V for transporting the seedling tray T toward the seedling pick-up device B, and a transplantation unit E for transferring the seedling P picked up from the seedling pick-up device B to an out-feeding conveyer D. The seedling supply unit A constructed as set forth above is integrally mounted on the movable frame 6 and a machine frame 11 vertically extending on the front side of the movable frame.

Figure 5:
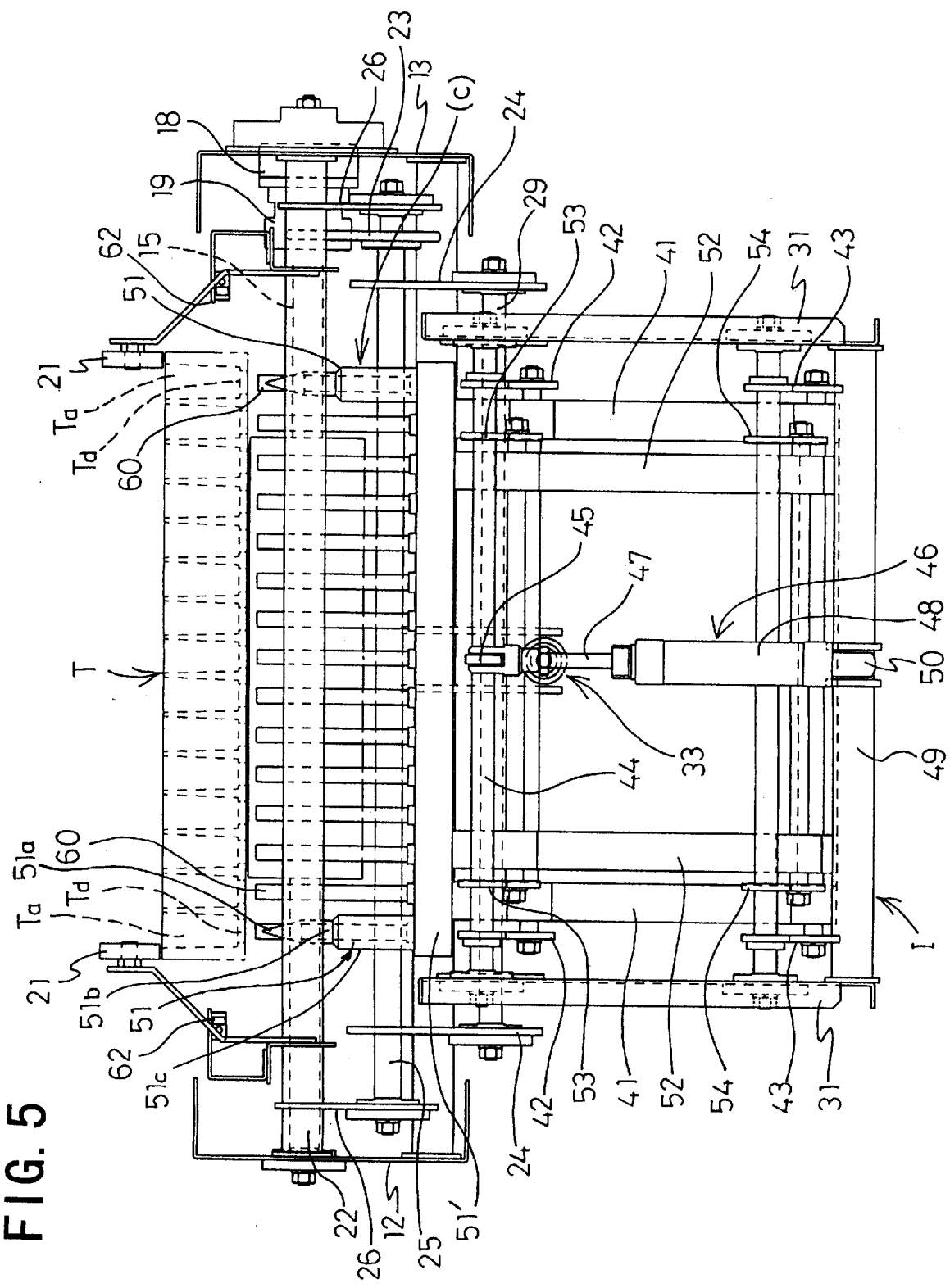
FIG. 5 is an enlarged front elevation of the portion around the seedling pick-up position.
Figure 6:
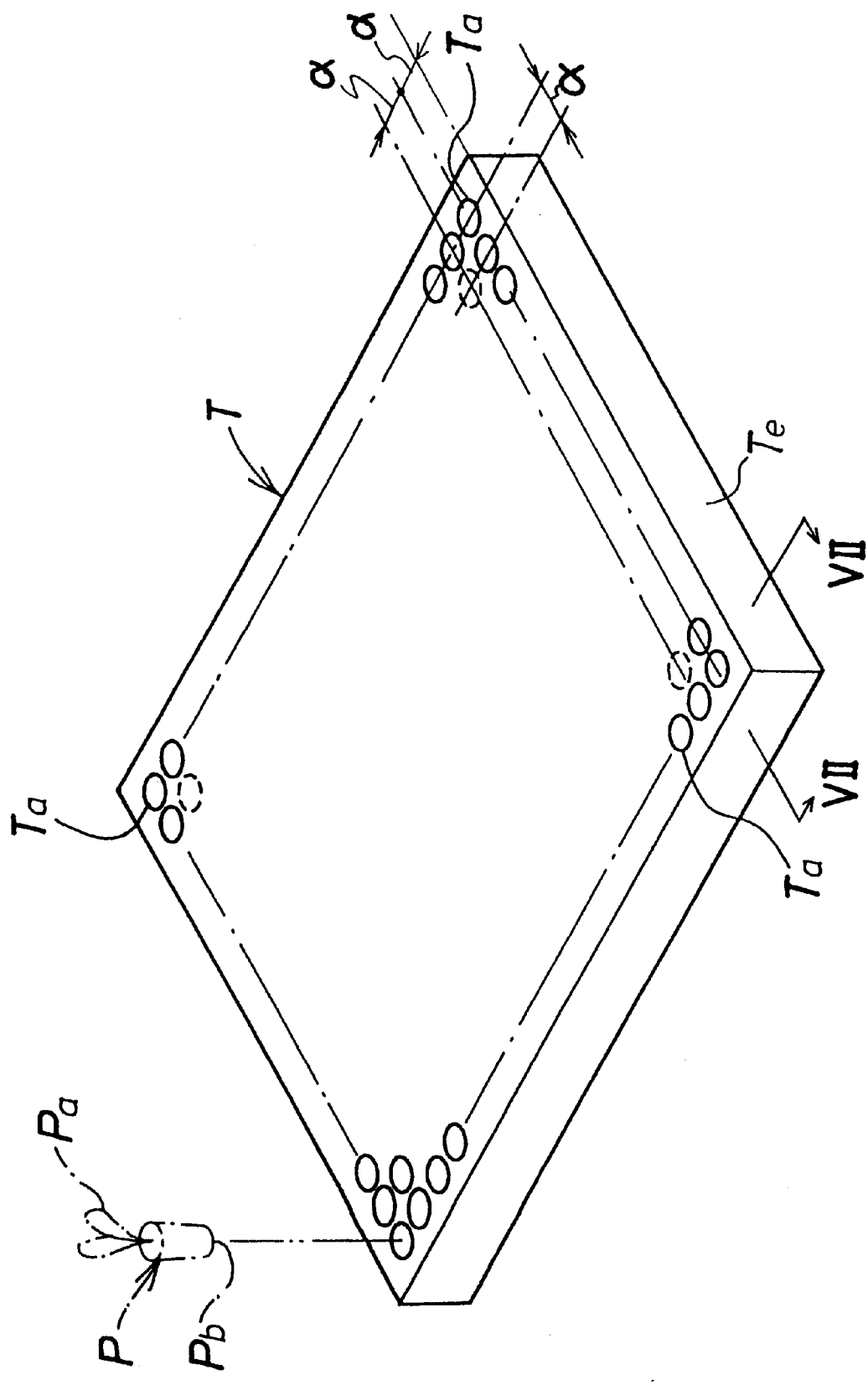
FIG. 6 is a perspective view of a seedling tray.
Figure 7:
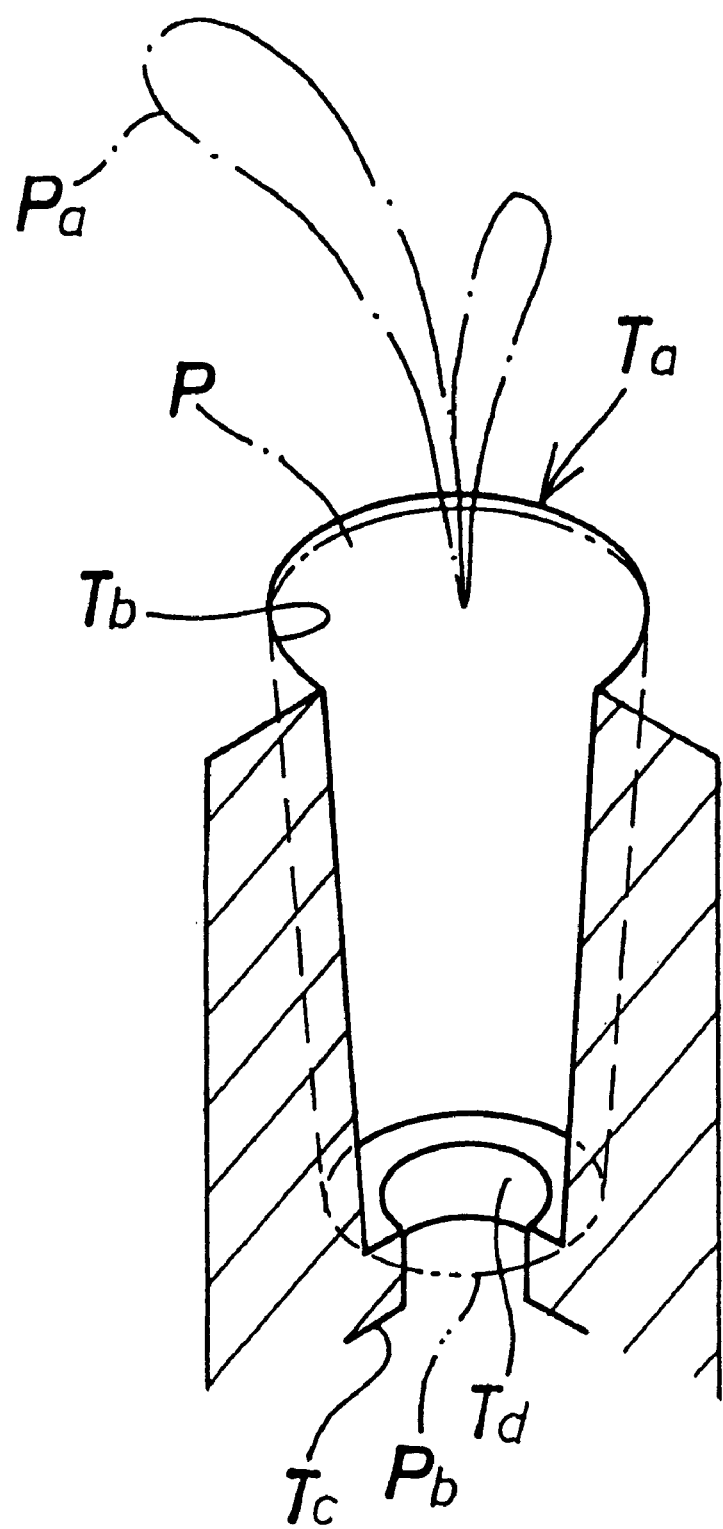
FIG. 7 is a partial section taken along line VII—VII of FIG. 6.

The seedling tray T is formed by arranging a plurality of cylindrical hole shaped seedling storage cells (hereinafter simply referred to as "cell") Ta, . . . in a tray body of foamed styrol, in a lattice like array with a predetermined pitch α in back and forth and left and right directions. Each cell Ta is formed with a gradually reducing diameter from the upper surface opening Tb to a bottom portion Tc. Also, in the bottom portion Tc, a rod insertion hole Td is formed (FIGS. 5 to 7). In addition, the given pitch a is also provided between a front end face Te of the seedling tray T and a first row of the cells (in the same direction as a transporting direction β of the seedling tray).

The seedling tray T is horizontally mounted on the tray transporting device C in the upright position so that each cell Ta is in a condition in which a leaf portion Pa of the seedling P is positioned upward.

Figure 3:
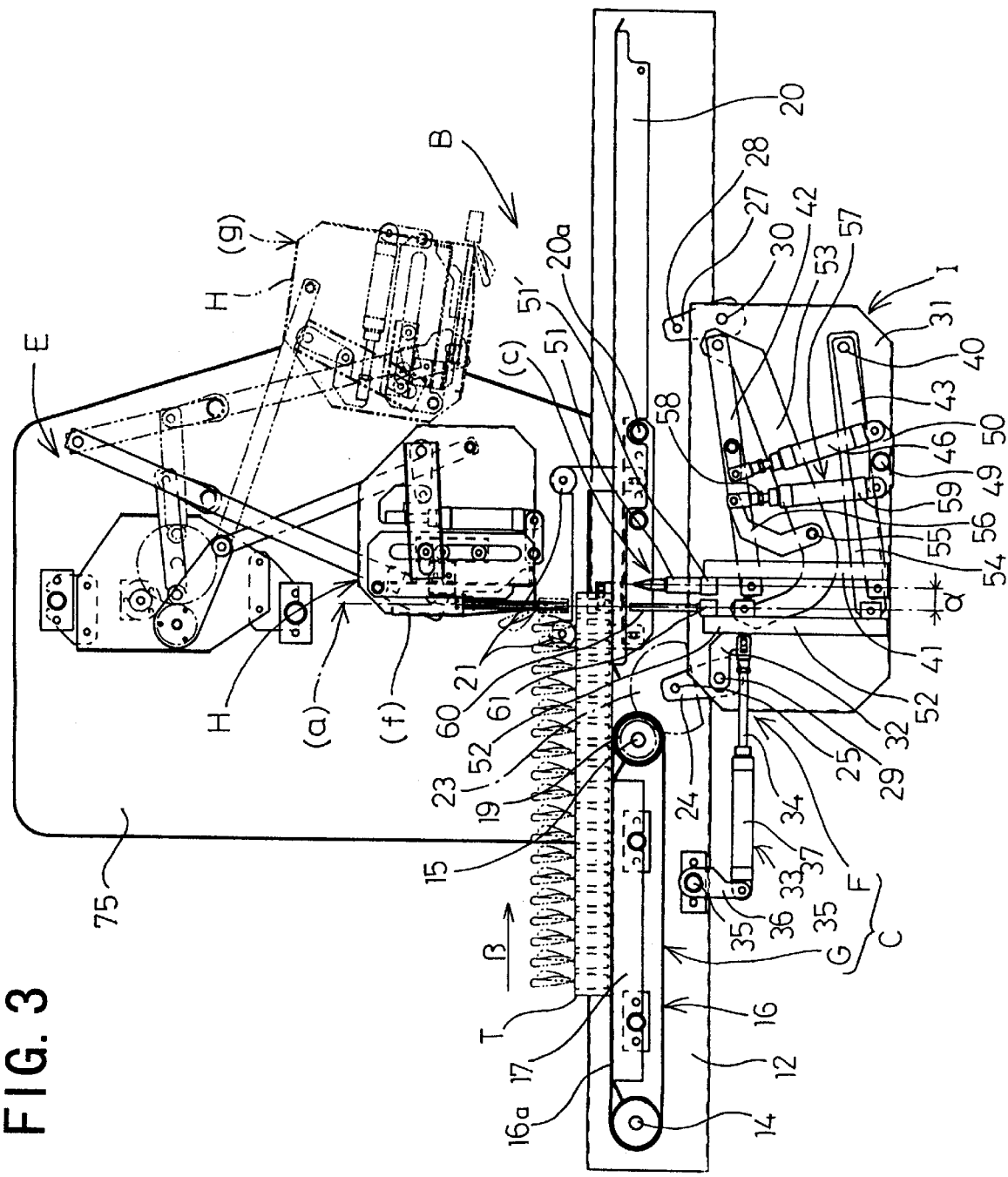
FIG. 3 is a side elevation of a seedling supply unit, in which is illustrated a condition where a first row of cells of the seedling tray is moved to a seedling pick-up position.

The tray transporting device C is constructed with a tray transporting drive portion F suspended in the lower portion of the center of a pair of laterally elongated side plates 12 and 13 and a tray transporting conveyer G driven by tray transporting drive portion F (FIGS. 1 and 3).

Tray Transporting Conveyer G

A construction of the tray transporting conveyer G is as follows.

Between the laterally elongated side plates 12 and 13, a tray transporting belt 16 is stretched on two belt stretching rollers 14 and 15 which are located at the rear end portion and an intermediate portion of the side plates. Between both belt stretching rollers 14 and 15, a belt holding plate 17 is arranged for holding an upper traveling portion 16a so that the upper traveling portion 16a of the tray transporting belt 16 forms a flat surface.

Figure 4:
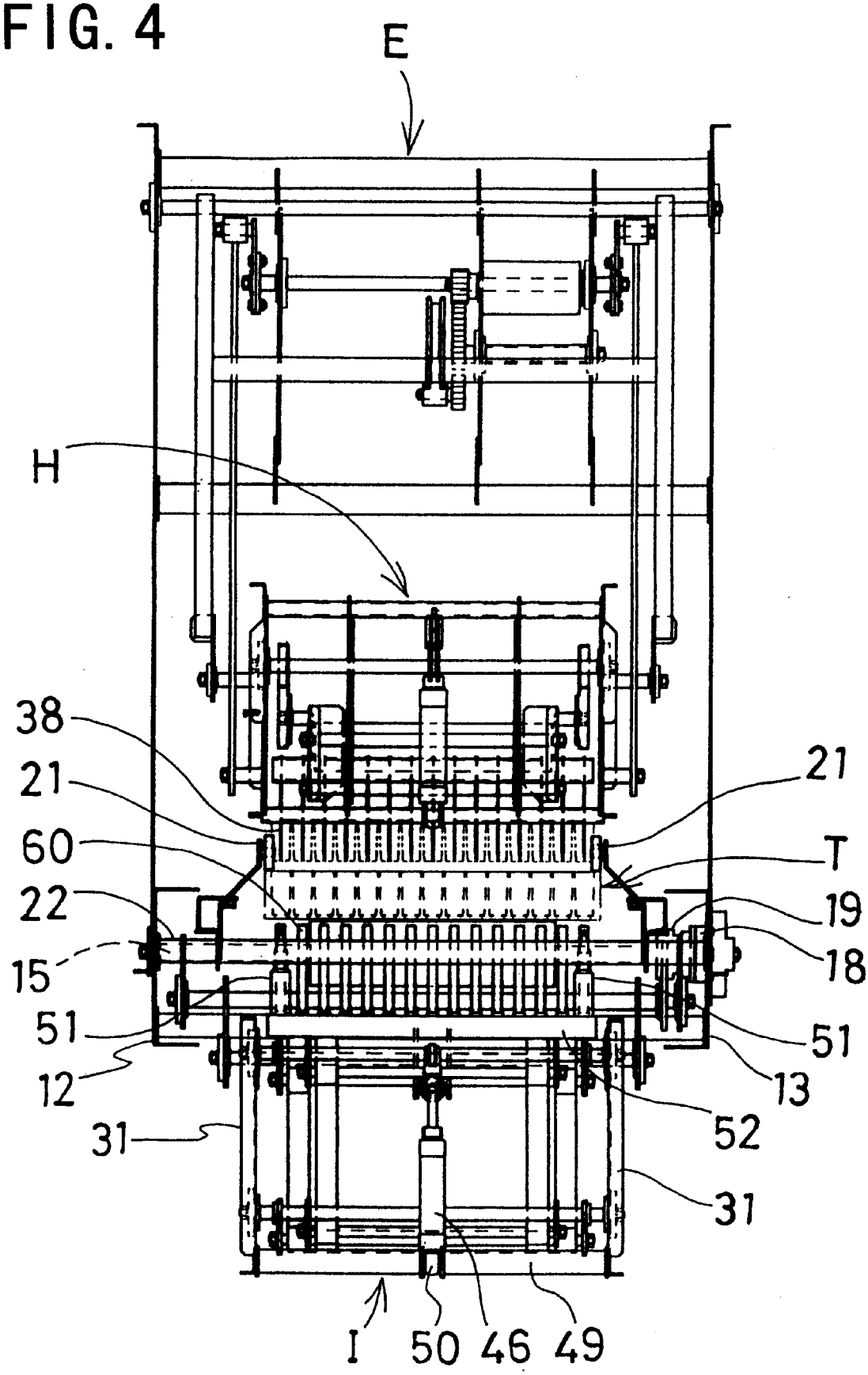
FIG. 4 is a front elevation of the seedling supply unit of FIG. 3.

On one end portion of the belt stretching roller 15, a gear 19 is mounted via an electromagnetic clutch 18 (FIGS. 4 and 5) permitting rotation in one direction, namely only movement of the upper traveling portion 16a of the tray transporting conveyer 16 in the direction of the downstream side in the transporting direction β of the seedling tray T. Via the electromagnetic clutch 18 and the gear 19, a driving force from the tray transporting drive portion F which will be discussed later, is transmitted to the belt stretching roller 15 (FIG. 5).

From the intermediate portion to the front end portion of the laterally elongated side plates 12 and 13, a pair of tray supporting plates 20, 20 for supporting the seedling tray T transferred from the tray transporting conveyer G, are arranged to be substantially flush with transverse members 20a, 20a extending laterally between the side plates 12 and 13 and the upper traveling portion 16a of the tray transporting belt 16 by a bracket (not shown) fixed to the transverse members 20a, 20a.

On the upper side of the rear end of the tray supporting plates 20, 20, tray retaining rollers 21, 21 which restrict lifting of the seedling tray T transported thereto, are provided on both sides across the transporting path of the seedling tray T.

Tray Transporting Drive Portion F

The construction of the tray transporting drive portion F is as follows.

At the intermediate portion of the laterally elongated side plates 12 and 13, transverse members 22, 22 (only one is shown) are extended therebetween. On the transverse member 22 on the upstream side of the transporting direction β among these transverse members 22, 22, a link support shaft 25 is mounted via brackets 26, 26 arranged on both ends thereof. On the link support shaft 25, a snaggletoothed gear 23 meshing with the gear 19 is fixed at one end. Also, via suspension links 24, 24 arranged at both end portions, the side plate support shaft 29 is suspended.

On the transverse member 22 on the downstream side of the transporting direction β among these transverse members 22, 22, a link support shaft 28 is mounted via brackets 26, 6 arranged on both ends thereof. On the link support shaft 8, the side plate support shaft 30 is suspended via suspension inks 27, 27 arranged at both end portions.

On the both ends of the side plate supporting shafts 29 nd 30, a pair of movable side plates 31, 31 are hung respectively.

At the center portion of the side plate support shaft 29, a bracket 32 is rigidly secured. On the bracket 32, a drive rod 34 of a fluid pressure cylinder 33, such as pneumatic cylinder, hydraulic cylinder and so forth. On the other hand, at the center portion of a transverse member 35 extending transversely between the laterally extending side walls 12 and 13 located at a lower portion of the tray transporting conveyer G, a bracket 36 is rigidly secured. On the bracket 36, a cylinder body 37 of the fluid pressure cylinder 33 is mounted.

By expansion and compression strokes of the drive rod 34 of the fluid pressure cylinder 33, the snagglettoothed gear 23 is rotated within a predetermined angular range about the link support shaft 25. Associating with this, the belt stretching roller 15 is rotated intermittently in one direction via the gear 19 and the electromagnetic clutch 18.

Accordingly, the tray transporting belt 16 intermittently drives the upper traveling portion 16a to travel with an internal of the arrangement pitch α of the cells Ta of the seedling tray T in the transporting direction β. On the other hand, associating with expansion and compression strokes of the drive rod 34, the movable side plates 31, 31 also swings in a back and forth direction.

Figure 8:
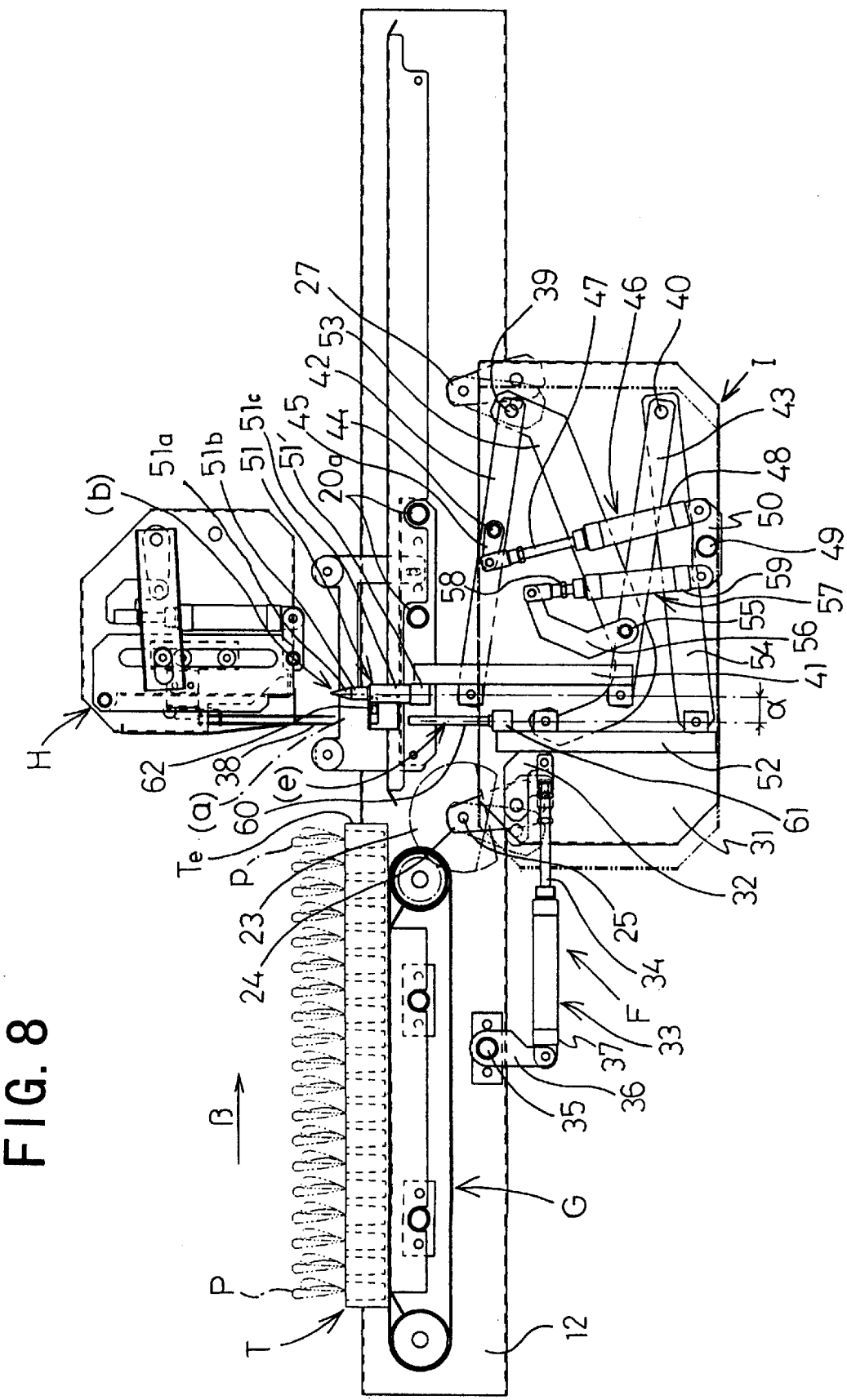
FIG. 8 is an explanatory illustration showing operation of a tray transporting device and a seedling push-up mechanism, in which is illustrated a condition where the seedling tray is transported toward the seedling pick-up position.

Seedling Pick-up Device B Next, the seedling pick-up device B includes a seedling holding mechanism H for moving a seedling holding needle 38 which pieces and holds the seedling P, in a vertical direction and the seedling pushing mechanism I which pushes up the seedling P stored in the cell Ta of the seedling tray T (FIGS. 1, 3, 8).

Seedling Pushing Mechanism I

The seedling pushing mechanism I is constituted of two link mechanisms which are constructed as follows.

First Link Mechanism

Between the upper and lower ends of the front side of the movable side plates 31, 31, two link supporting shafts 39, 49 are extended.

On the link supporting shafts 39, base end portions of a pair of swing links 42, 42 are pivotably supported. On the other hand, a the link support shaft 40, base end portions of a pair of swing links 43, 43 are pivotably supported. On the other hand, between the free ends of these upper and lower swing links 42, 43 and 42, 43, respective vertical links 41, 41 are pivotably connected.

Between the swing links 42, 42, a connecting member 44 is extended. A drive rod 47 of a fluid pressure cylinder 46, such as a hydraulic cylinder, is mounted via a bracket 45 which is provided at the center portion of the connecting member 44. On the other hand, a cylinder body 48 is pivotably supported by a bracket 50 provided at the center portion of a connecting member 49 extending transversely on the lower end portion at the center of the movable side plates 31, 31 (FIGS. 3, 5, 8).

Between upper end portions of the vertical links 41, 41, rod support member 51', from which a pair of tray positioning rods 51, 51 are extended vertically opposing two cells Ta, Ta respectively located at both transverse ends of the row of cells of the seedling tray T.

The tray positioning rods 51 are formed to have a cone-shaped tip end portion 51a, and an intermediate portion 51b following the tip end portion 51a, and formed to have an external diameter matching with an internal diameter of rod insertion holes Td. On the other hand, the base end portion 51c is formed into a cylindrical shape formed to have a greater diameter than the rod insertion hole Td.

Namely, even when the seedling tray T is slightly shifted, as long as the cone-shaped tip end portion 51a is placed in opposition to the rod insertion hole Td, the position error of the seedling tray T can be corrected to position the seedling tray T associating with insertion of the tray positioning rod 51 into the tray insertion hole Td.

Furthermore, by inserting and engaging the intermediate portion 51b in the rod insertion hole Td, the seedling tray T can be accurately positioned.

The tray positioning rods 51, 51 can be placed at a tray positioning position (b) and a stand-by position (c). Namely, by expansion and compression stroke of the drive rod 47 of the fluid pressure cylinder 46, the vertical links 41, 41 are moved vertically via swing links 42, 42, 43, 43. Thus, the tray positioning rods 51, 51 are inserted into the cells Ta of the seedling tray T for reciprocally moving between the tray positioning position (b) for positioning the seedling tray T, and the stand-up position (c), in which the tray positioning rods 51, 51 move below the seedling tray.

Second Link Mechanism

On the link support shaft 39, the base end portions of a pair of upper and lower swing links 53, 53 are pivoted. On the link support shaft 40, the base end portion of a pair of swing links 54, 54 are pivoted. Between the free ends of these swing links 53, 54 and 53, 54, vertical links 52, 52 are pivotably connected.

Furthermore, between the vertical links 53, 53, a connecting member 55 is extended transversely. On a bracket 56 rigidly secured at the center of the connecting member 55, a drive rod 58 of a fluid pressure cylinder 57 is mounted. The cylinder body 59 of the fluid pressure cylinder 57 is pivotably connected to a bracket 50 provided at the lower end portion at the center of the movable side plates 31, 31.

Between the upper end portions of the vertical links 52, 52, a push rod support member 61 is extended transversely, on which seedling push rods 60 for pushing the seedlings P stored in the cells Ta arranged in rows in the seedling tray T, are extended vertically.

The seedling pushing rods 60 are arranged in a distance equal to an arrangement pitch α of the cell Ta of the seedling tray T, on the upstream side of the transporting direction β of the seedling tray T from the tray positioning rod 51 (FIGS. 1, 3, 8).

Each seedling pushing rods 60 is a round-based member having a thickness to be inserted into the rod insertion hole Td of the cell Ta of the seedling tray T. The seedling pushing rods 60 corresponding to respective cells Ta . . . forming the row of the cells are arranged in the same number as that of the cells Ta . . . in equal pitch α.

Figure 9:
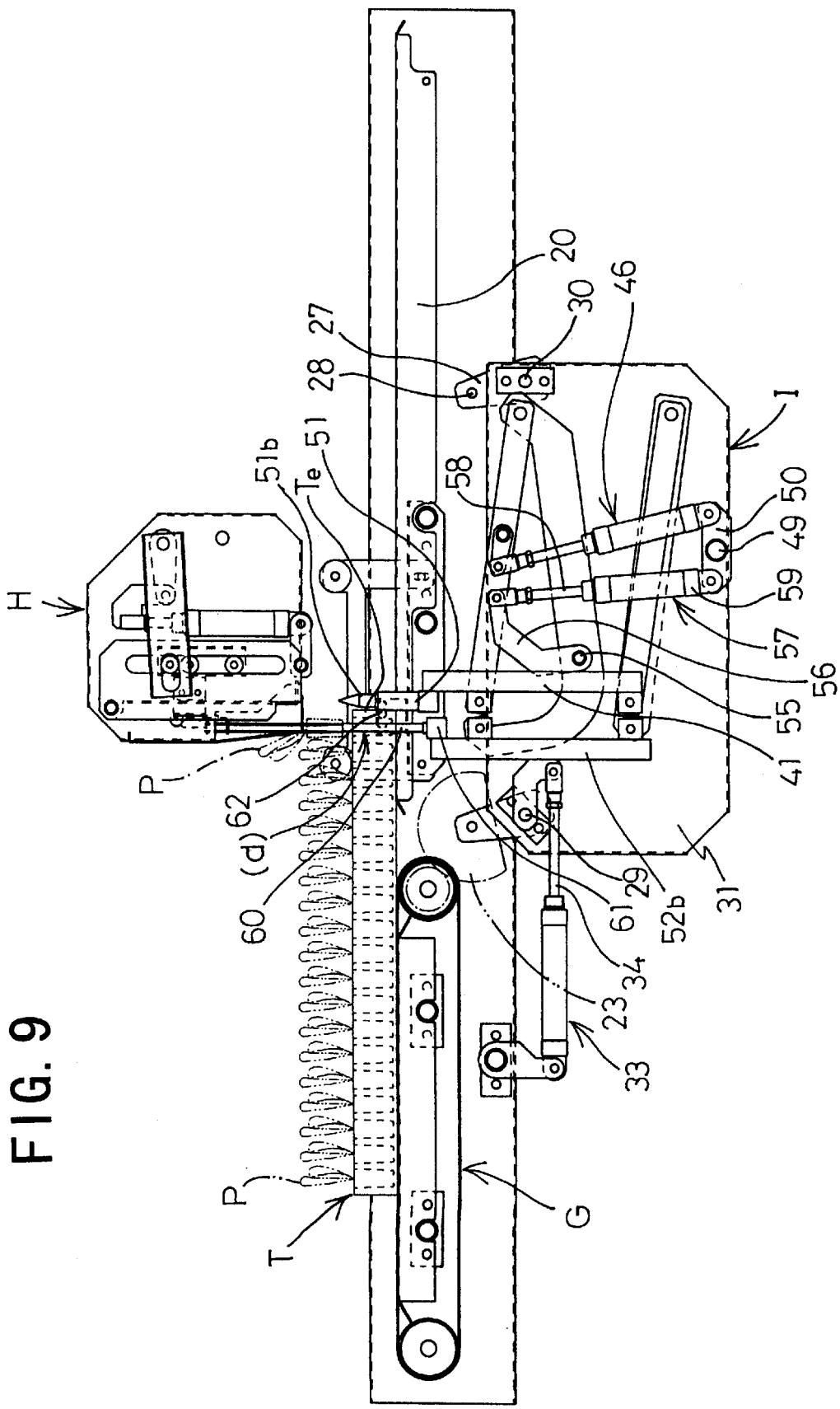
FIG. 9 is an explanatory illustration showing operation of a tray transporting device and a seedling push-up mechanism similar to FIG. 8, in which is illustrated a condition where the seedling tray is positioned by abutting the front end face thereof on a tray positioning rod and the seedling is picked up with maintaining the positioned condition.
Figure 10:
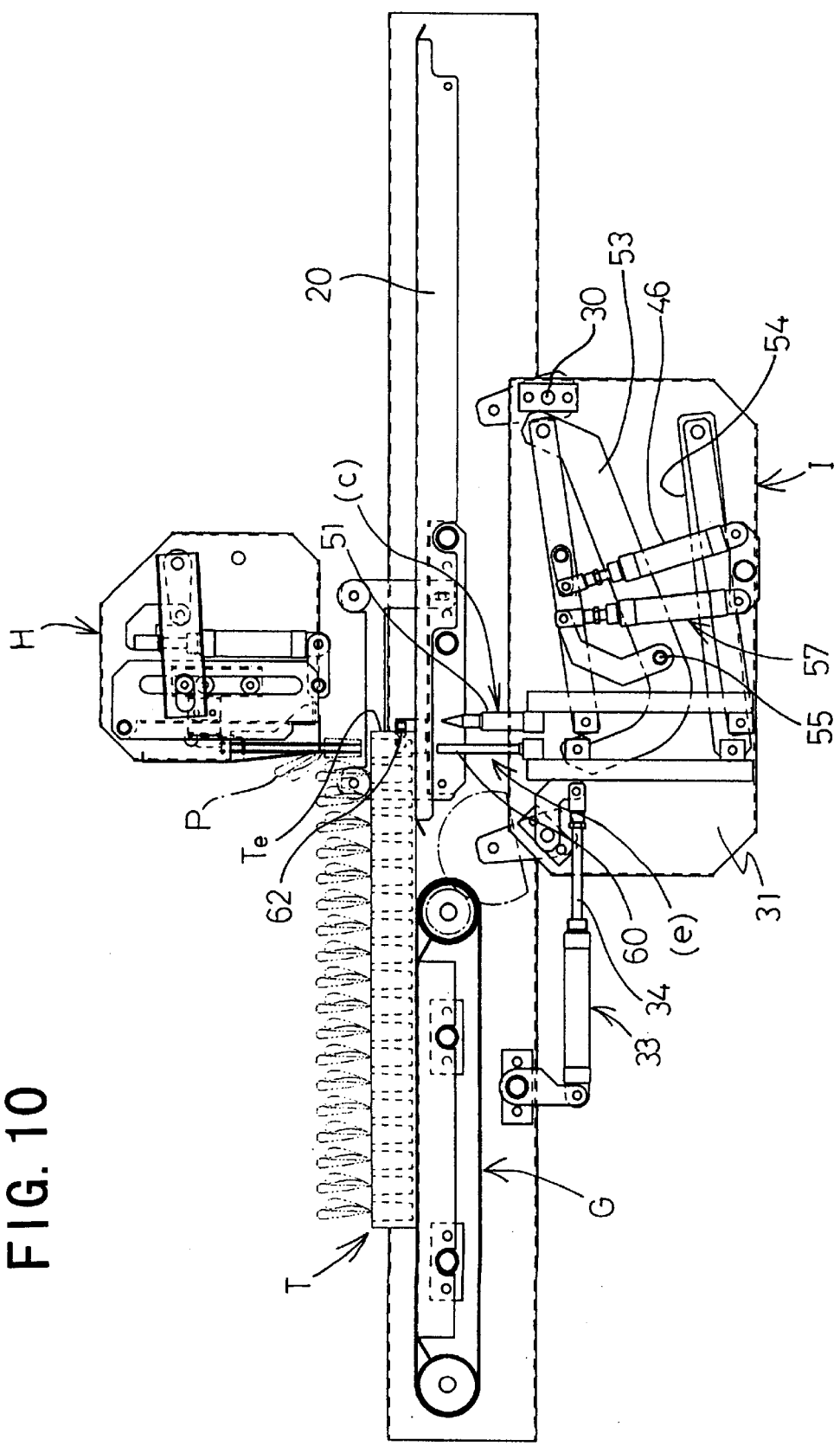
FIG. 10 is an explanatory illustration showing operation of a tray transporting device and a seedling push-up mechanism similar to FIG. 8, in which is illustrated a condition where the seedling tray is maintained in place and the tray positioning rod and a seedling pushing rod are lowered.

By expansion and compression strokes of the drive rod 58 of the fluid pressure cylinder 57, the vertical links 52, 52 are moved vertically via the swing links 53, 53, 54, 54. The seedling contact surface of the seedling pushing rods 60 can be moved reciprocally between a pushing completion position (d) pushing the seedling contact surface to project upper side beyond the upper surface of the seedling tray and a pushing stand-by position (e) placing the seedling contact surface below the seedling tray T (FIGS. 9 and 10).

On the upstream side in the transporting direction β of the seedling tray T at the tray positioning position (b) where the tray positioning rod 51 is in upwardly shifted position, tray detection sensors 62, 62 for detecting the seedling tray T transported toward the tray positioning rod 51, are arranged.

When the tray positioning rods 51, 51 are in the tray positioning position (b), the seedling pushing rods 60 are driven to elevate upwardly by detecting the seedling tray T by the tray detection sensors 62, 62.

Tray Transporting Device C and Seedling Pushing Mechanism I

Operation of the tray transporting device C and the seedling pushing mechanism I constructed as set forth above, will be discussed with reference to FIGS. 8 to 14.

The seedling tray T mounted on the tray transporting conveyer G are intermittently transported toward downstream side in the transporting direction β associating with expansion and compression stroke of the drive rod 34 of the fluid pressure cylinder 33 (FIG. 8).

At this time, the tray positioning rod 51 is moved to the tray positioning position (b). On the other hand, the seedling pushing rod 60 is moved to the pushing stand-by position (e).

By several times of expansion and compression strokes of the drive rod 34 of the fluid pressure cylinder 33, the front end face Te of the seedling tray T comes into contact with the intermediate portion 51b of the tray positioning rod 51. On the other hand, at a position where the seedling pushing rod 60 matches with the seedling pick-up position (a), the drive cylinder 34 of the fluid pressure cylinder stops at an expanded condition.

By contacting the front end face Te of the seedling tray T onto the intermediate portion 51b of the tray positioning rod 51, the cells Ta . . . forming the first row in the seedling tray T are moved to the seedling pick-up position (a). This condition is detected by the tray detection sensors 62, 62. By detection of the front end face Te of the seedling tray T by the tray detection sensors 62, 62, the seedling pushing rods 60 are elevated upwardly to be inserted into respective cells Ta . . . forming the first row. By this, the seedling P stored in respective cells Ta are pushed up to be picked up (FIG. 9).

Figure 11:
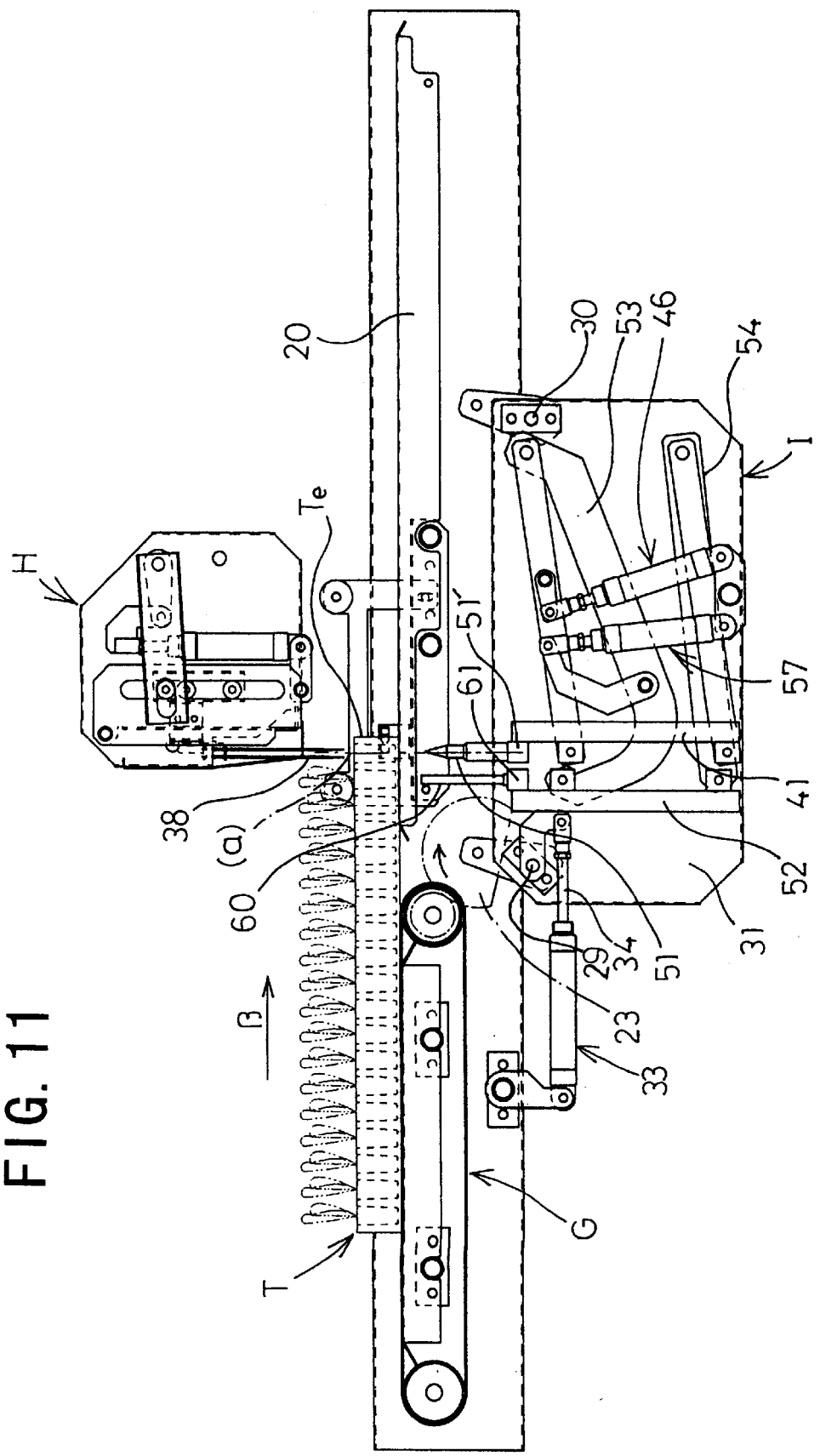
FIG. 11 is an explanatory illustration showing operation of a tray transporting device and a seedling push-up mechanism similar to FIG. 8, in which is illustrated a condition where the seedling tray is maintained in place and the tray positioning rod is moved to the seedling pick-up position.
Figure 12:
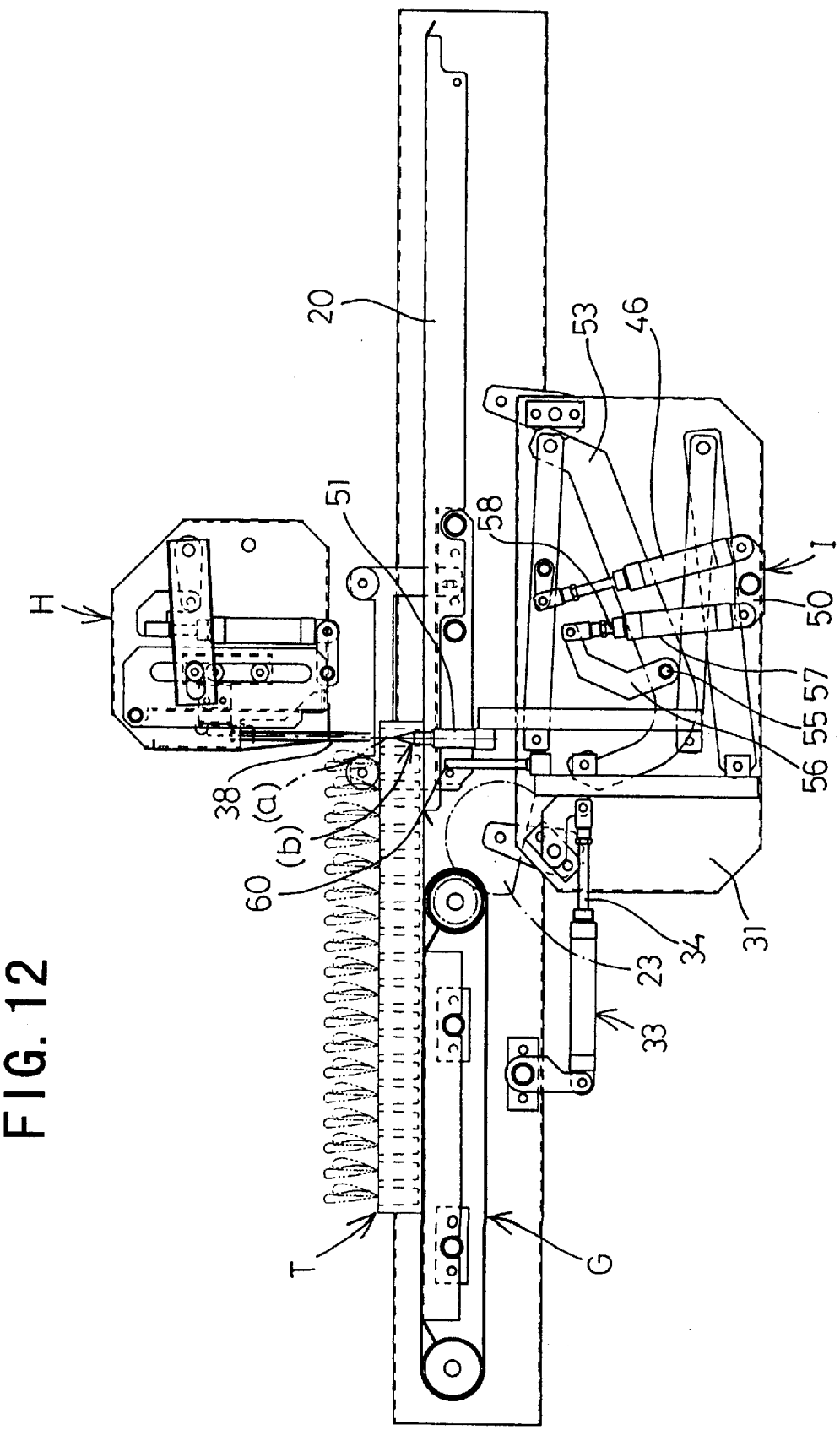
FIG. 12 is an explanatory illustration showing operation of a tray transporting device and a seedling push-up mechanism similar to FIG. 8, in which is illustrated a condition where the tray positioning rod is moved to a tray positioning position for positioning the seedling tray.

In the condition where the seedling tray T is stopped, the stand-by position of the tray positioning rod 51 (c) is driven to be lowered. In conjunction therewith, after driving to lower the seedling pushing rod 60 to the pushing stand-by position (e) (FIG. 10), the driving rod 34 of the fluid pressure cylinder 33 is contractingly driven. The tray positioning rod 51 is moved to the seedling pick-up position (a). In conjunction therewith, the seedling pushing rod 60 is placed in opposition to the second row of the cells of the seedling tray T (FIG. 11). In the seedling pick-up position (a), the tray positioning rod 51 is moved upwardly to the tray positioning position (b) to insert into the cells Ta, Ta respectively located at the both ends of the first row of cells in the seedling tray T (FIG. 12). By this, the seedling tray T can be positioned by the tray positioning rod 51.

Figure 13:
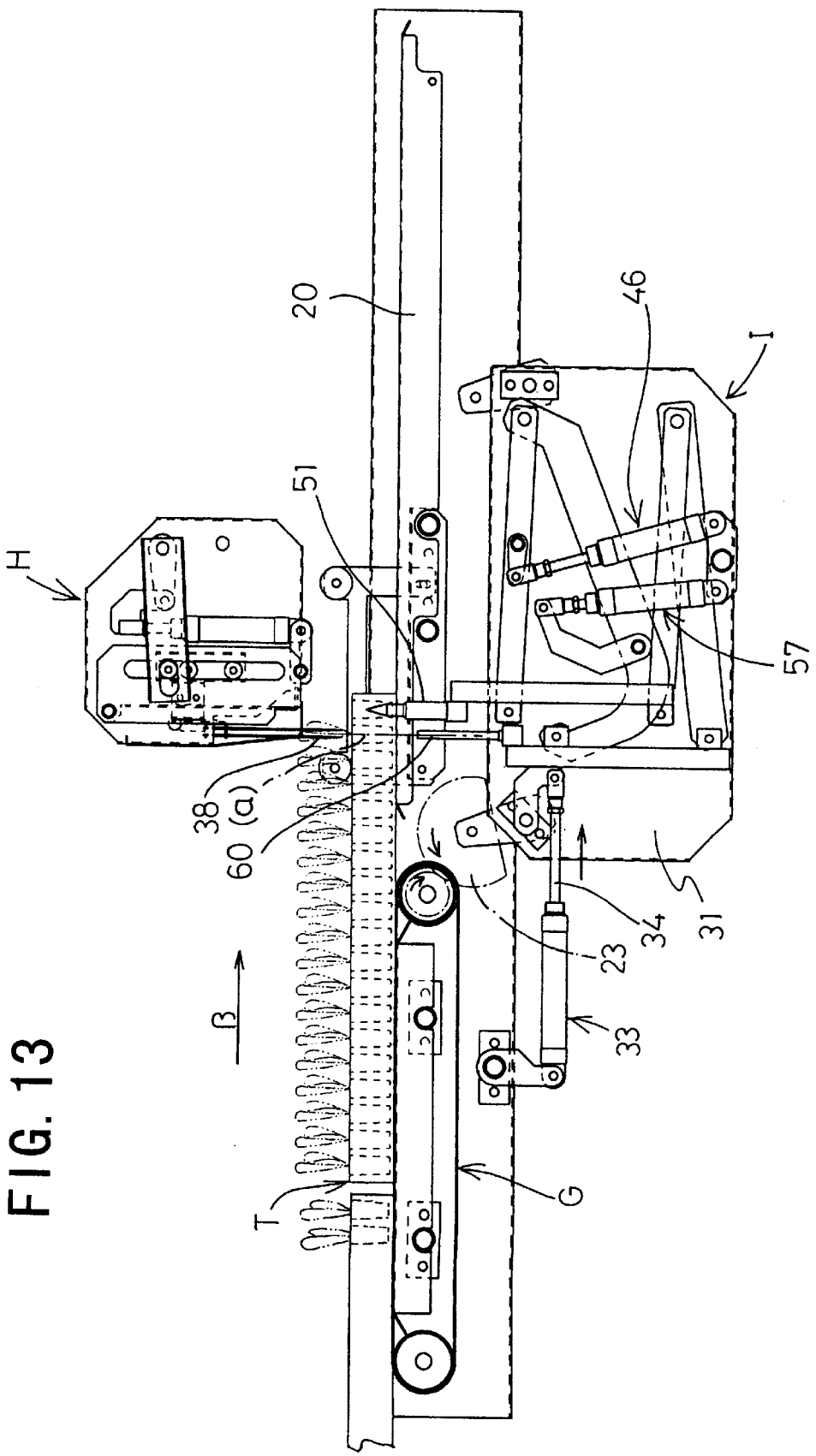
FIG. 13 is an explanatory illustration showing operation of a tray transporting device and a seedling push-up mechanism similar to FIG. 8, in which is illustrated a condition where the tray positioning rod is moved in a magnitude corresponding to a predetermined pitch of the seedling storage cell toward downstream side in the transporting direction of the seedling tray.

Next, by driving the drive rod 34 of the fluid pressure cylinder 33 for expansion, the seedling tray T can be shifted for the arrangement pitch α of the cells Ta toward downstream side in the transporting direction β of the seedling tray T in the condition where the tray position rods 51 are inserted into the cells Ta, Ta in the first row of the cells. Then, the second row of cells Ta . . . are moved to the seedling pick-up position (a) (FIG. 13).

Figure 14:
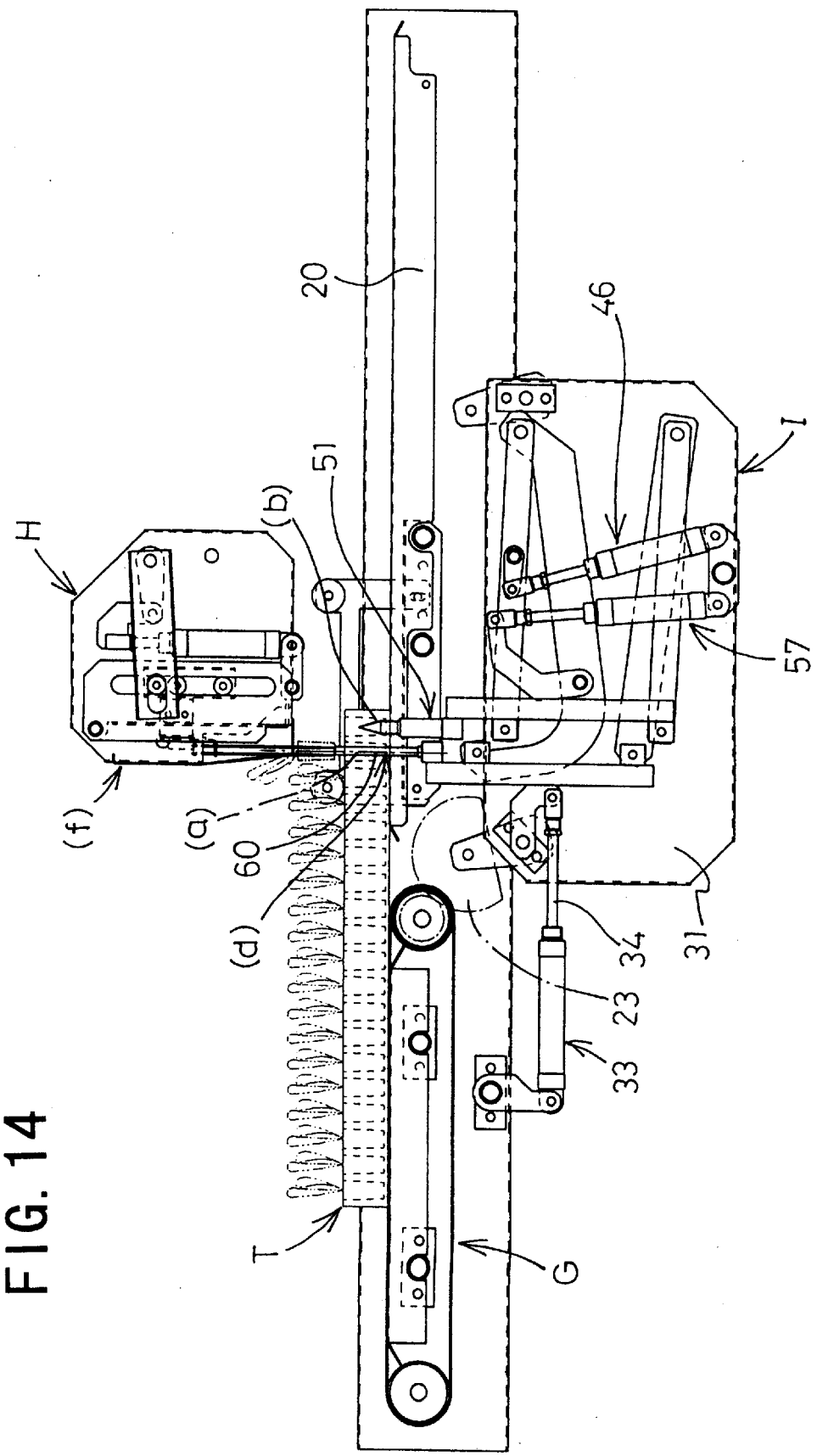
FIG. 14 is an explanatory illustration showing operation of a tray transporting device and a seedling push-up mechanism similar to FIG. 8, in which is illustrated a condition where a seedling is picked up from the seedling storage cell while the seedling tray is positioned by the tray positioning rod.

Then, the tray positioning rod 51 is moved to the pushing completed position (d) by driving the seedling push rods 60 upwardly, in the condition where the tray positioning rods 51 are maintained in the condition inserted into the cells Ta, Ta of both ends of the first row of the cells of the seedling tray T to push up the seedlings P stored in the cells Ta in the second row (FIG. 14).

Thus, the seedling pushing rods 60 can be inserted into the cells in the Nth row of the seedling tray T for picking up the seedlings P. Subsequently, the tray positioning rods 51, 51 are moved for the arrangement pitch of the seedling storage cells Ta toward the downstream side in the transporting direction β of the seedling tray. Subsequently, the seedling pushing rod 60 is inserted into the cells Ta in the (N+1)th row. Thus, the seedlings P stored in the first row to subsequent rows are picked up in sequential order.

Seedling Holding Mechanism H

Figure 15:
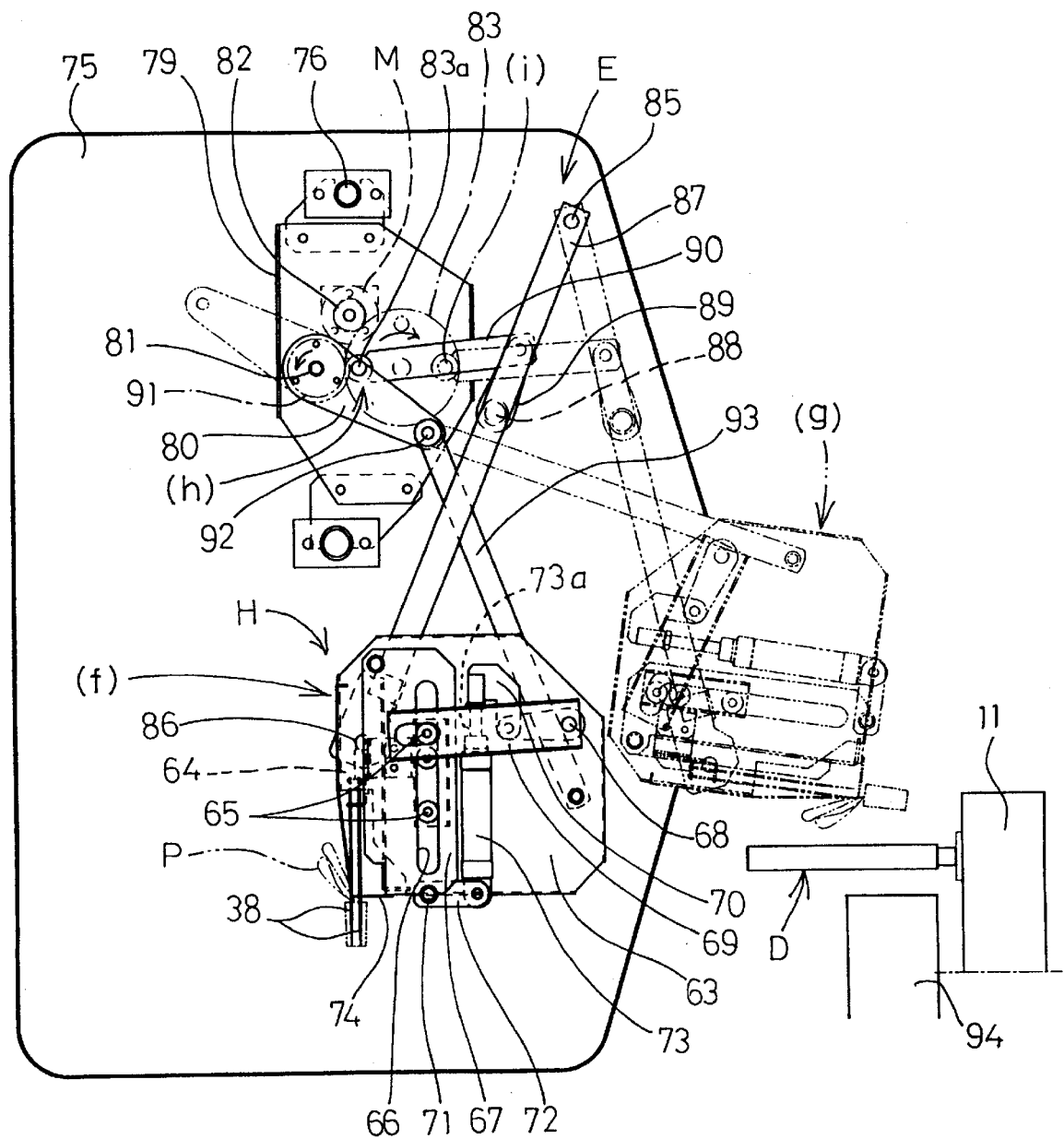
FIG. 15 is an enlarged side elevation of a transplanting unit and a seedling holding mechanism.
Figure 16:
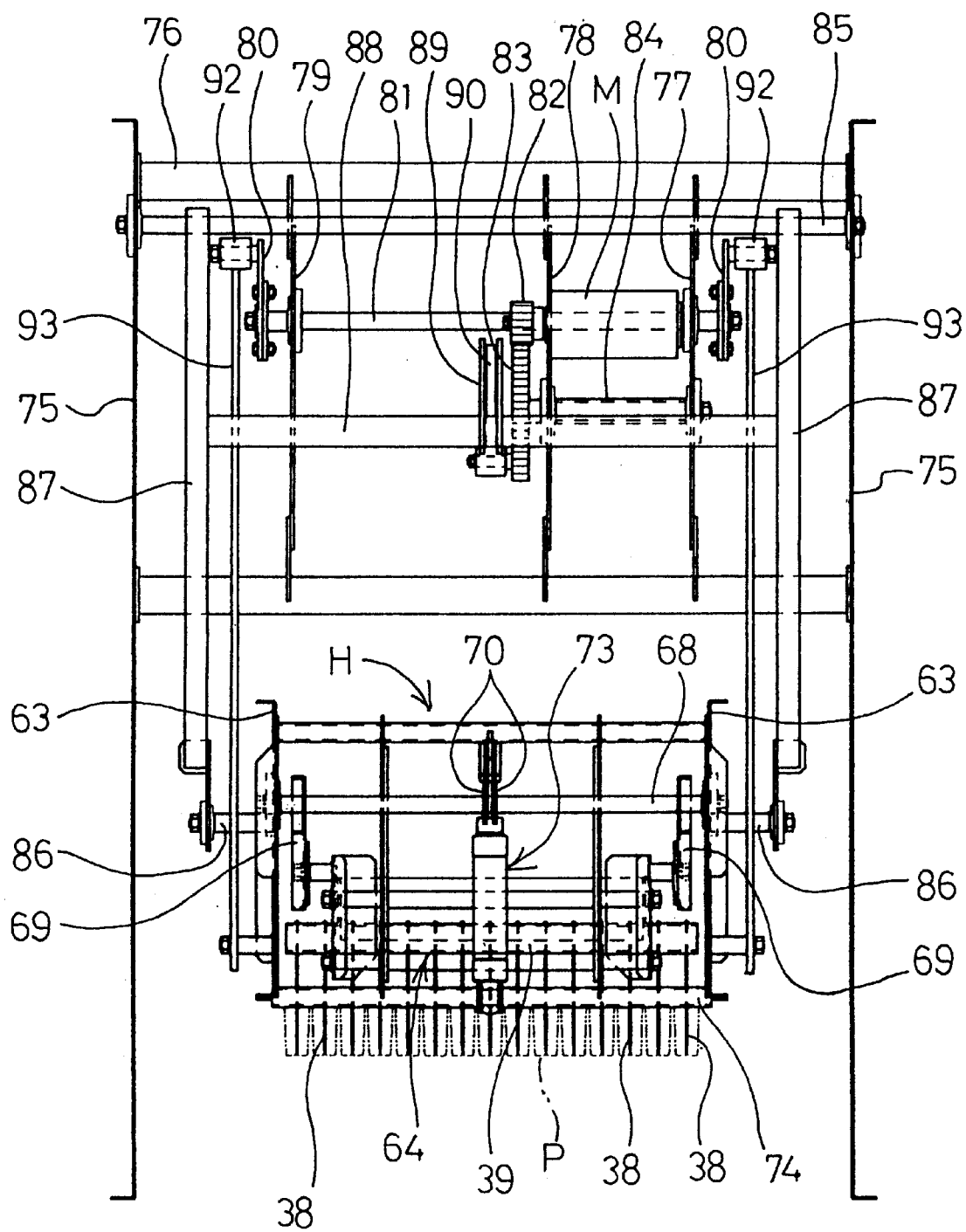
FIG. 16 is a front elevation of the transplanting unit and the seedling holding mechanism of FIG. 15.

Next, the seedling holding mechanism H has seedling holding needles 38 which are inserted into the cells Ta forming respective rows moved into the seedling pick-up position (a) for reciprocal movement between the seedling piecing position (f) placing the seedling holding needles in the closest position to the upper opening Tb of the cells Ta and a seedling release position (g) above the transporting conveyer for transferring the seedling P to the transporting conveyer D. The construction will be discussed for the case where the seedling holding mechanism H is shifted to the seedling piecing position (f) (FIGS. 15, 16).

On the rear end portion side of a pair of side plates 63, 63, a needle supporting member 64, on which a plurality of seedling holding needles 38 . . . are vertically provided in alignment on the tip end portion and a guide plate 67 formed with guide grooves 66 guiding the rollers 65, 65 arranged on both sides of the needle supporting member 64.

Figure 17:
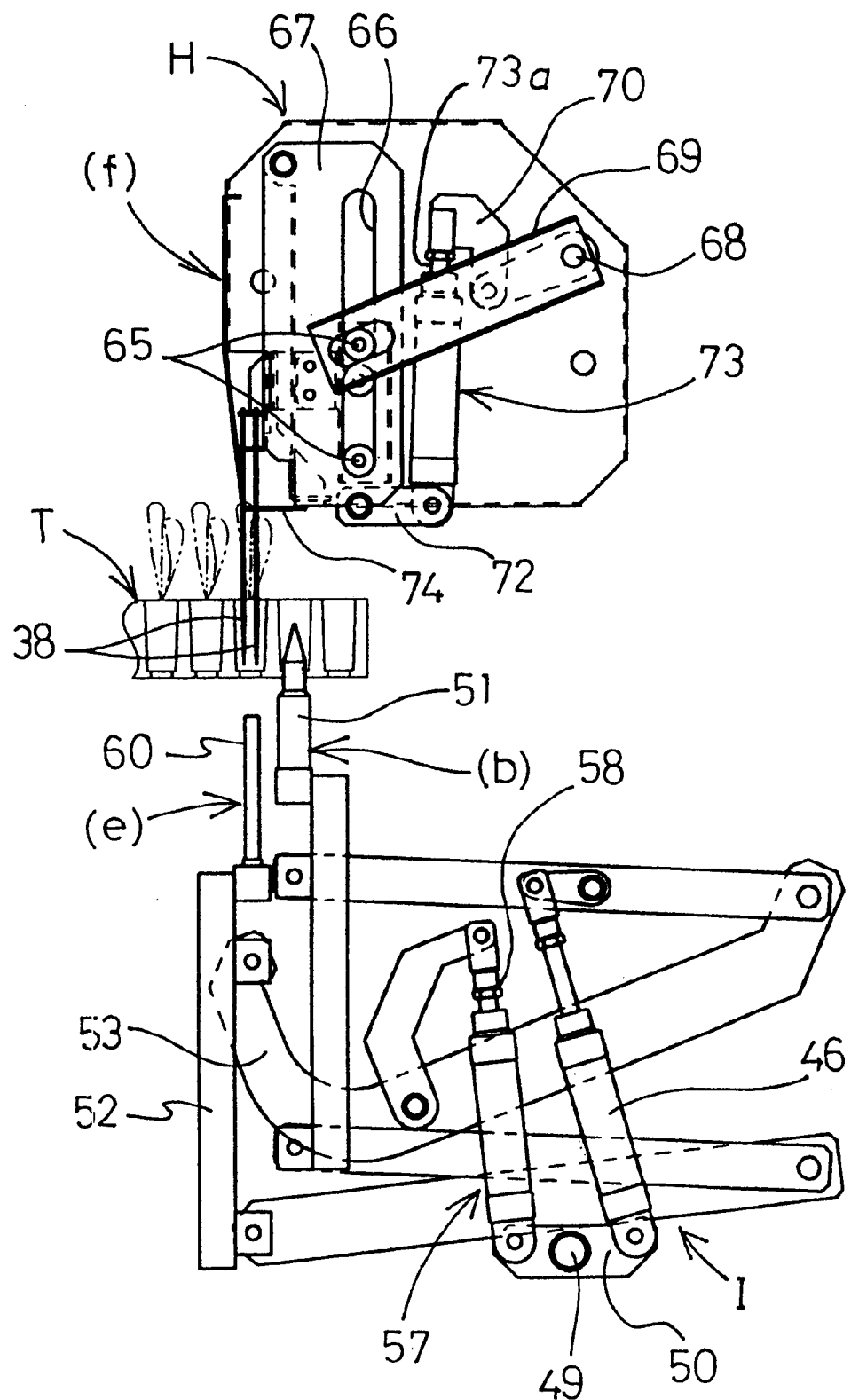
FIG. 17 is an explanatory illustration showing operation of a seedling pushing mechanism and the seedling holding mechanism, in which is illustrated a condition where the seedling tray is positioned by the tray positioning rod and a seedling holding needle is lowered within the seedling storage cells.

The needle supporting member 64 is pivoted between the free end portions of swing arms 69, 69 pivoting the base end portion about a shaft extending between the front end portions of the left and right side plates 63, 63. On the other hand, between a bracket 70 provided at the center portion of the shaft 68 and a bracket 72 provided at the center of the transverse member 71 extending transversely at the center of the lower end portion of the side plates 63, 63 a fluid pressure cylinder 73 utilizing fluid pressure, such as pneumatic pressure, hydraulic pressure or so forth, is disposed (FIGS. 15 to 17).

The fluid pressure cylinder 73 is adapted to be driven in synchronism with the seedling pushing mechanism I by detecting the seedling tray T by the tray detecting sensor 62.

The seedling holding needle 38 is straight. The seedling holding needles 38 are arranged in alignment along the direction of the row of the cells with a pitch corresponding to the pitch α between the cells Ta of the seedling tray T, two needles for each cell. On the other hand, in the rear end portion of the side plates 63, 63, the seedling release plate 74, on which needle loosely insertion holes (not shown), loosely receiving respective seedling holding needles 38 are provided in alignment, are provided.

In the seedling piercing position (f), when the seedling tray T is detected by the tray detection sensor 62, a drive rod 73a of the fluid pressure cylinder 73 is driven for compression to downwardly drive the seedling holding needles 38 to pierce the seedlings P stored in the cells Ta . . . At substantially the same timing, the seedling pushing rods 60 are moved upwardly to contact the seedling contact faces with the bottom surface of the seedlings P within the cells Ta.

Figure 18:
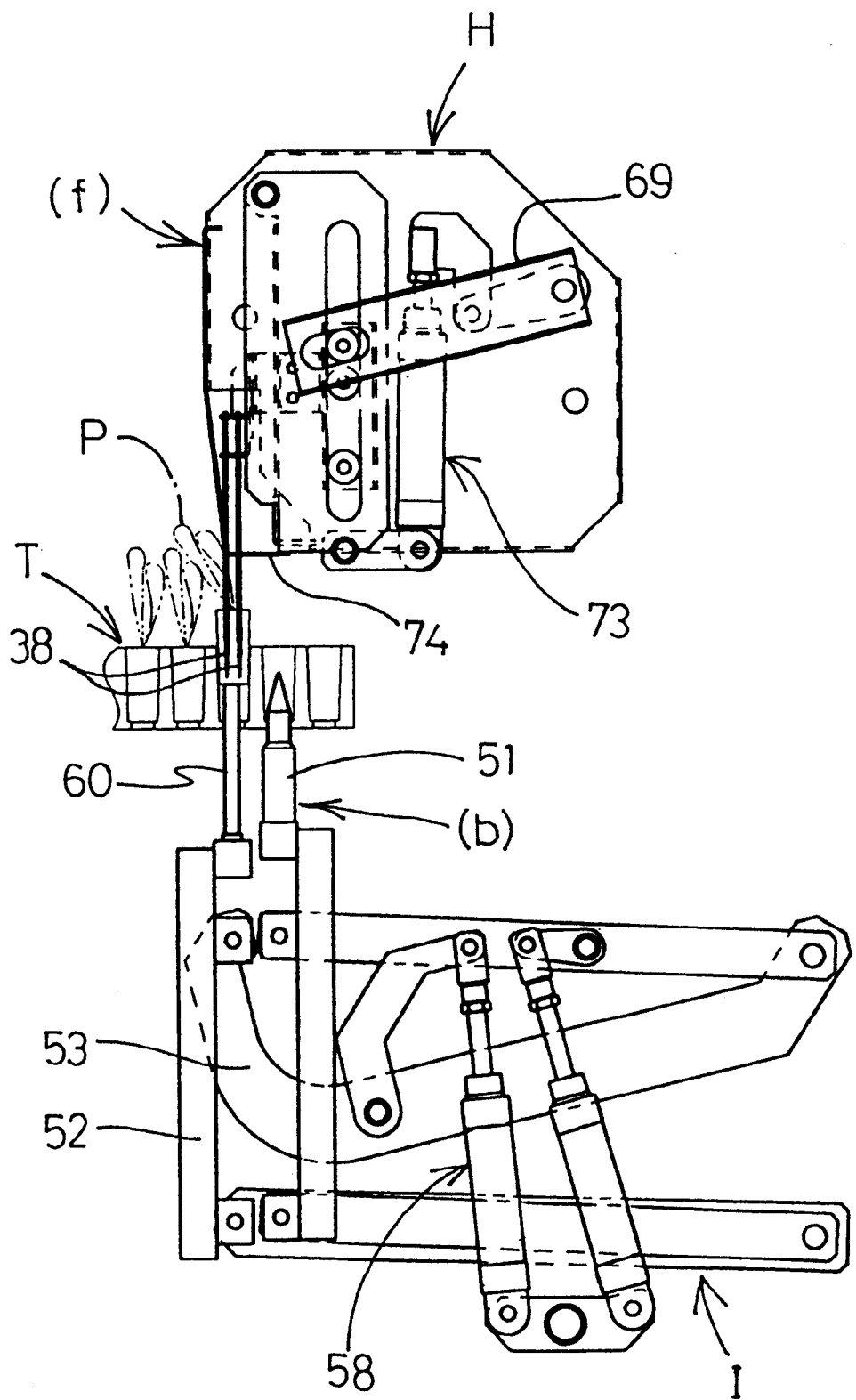
FIG. 18 is an explanatory illustration showing operation of a seedling pushing mechanism and the seedling holding mechanism similar to FIG. 17, in which is illustrated a condition where the seedling holding needle piercing and holding the seedling, and the seedling push rod are elevated synchronously with each other.
Figure 19:
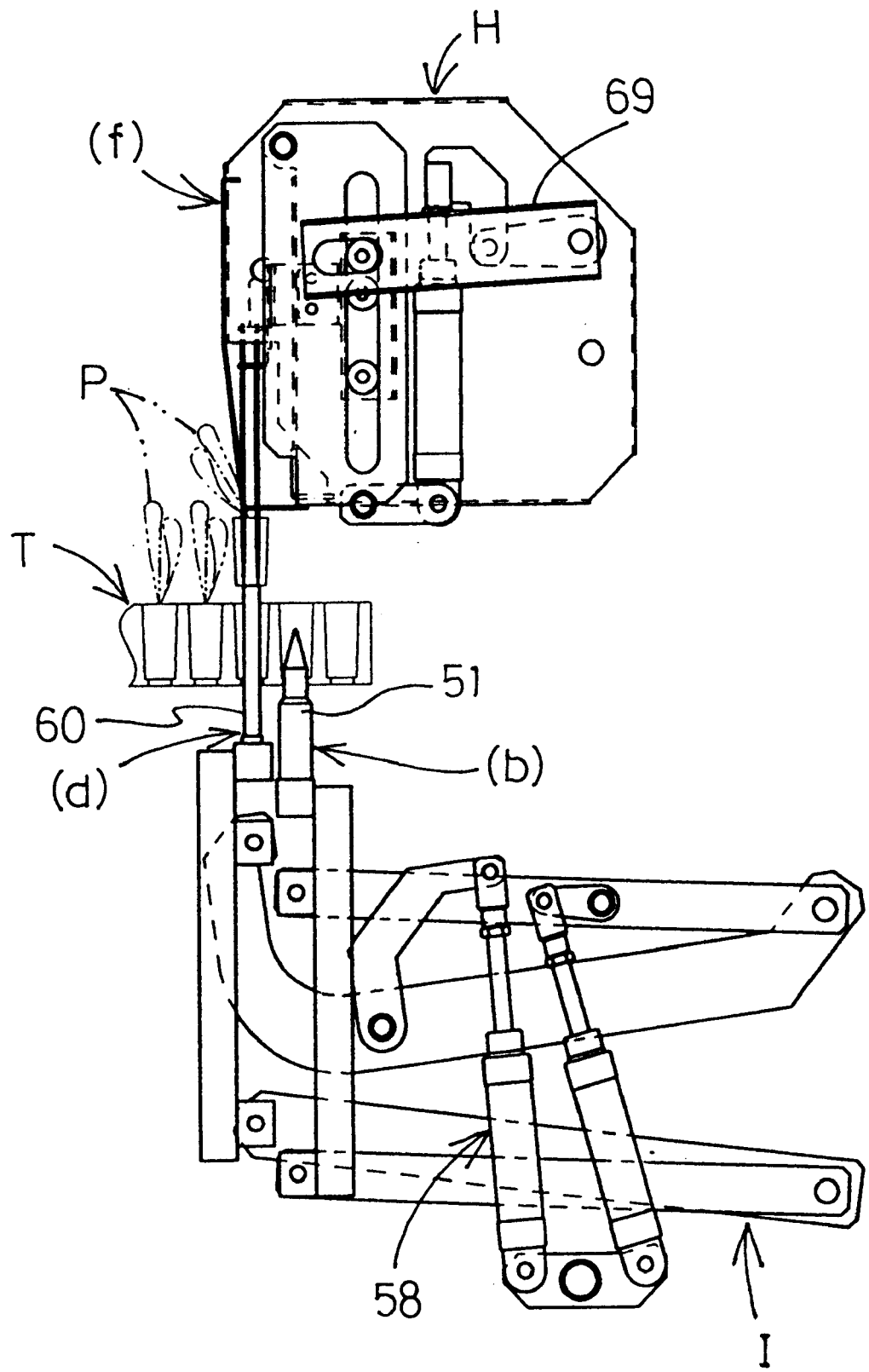
FIG. 19 is an explanatory illustration showing operation of a seedling pushing mechanism and the seedling holding mechanism similar to FIG. 17, in which is illustrated a condition where the seedling holding needle and the seedling push rod are moved to a pushing completion position.

After contacting the seedling contact faces of the seedling pushing rods 60 with the bottom surface of the seedling P within the cells Ta, in synchronism with driving of the seedling pushing rods upwardly, the seedling holding needles 38 are driven upwardly at the same speed as that of the seedling pushing rods 60 (FIG. 18). In other words, the seedlings P are maintained in the position pierced by the seedling holding needles 38, and are moved to the pushing completed position (d) (FIG. 19) in the condition supported from the lower side by the seeding pushing rods 60 for preventing falling off.

Transfer Device E

The construction of the transfer device E is as follow.

A connection pipe 76 is transversely extended between the upper end portions of a pair of left and right side plates 75, 75. Between support legs 77 to 79 vertically extended from the side plates 75, 75, support shafts 81 fixed brackets 80, 80 at both ends thereof, are rotatably extended thereacross. On the other hand, between the support legs 77 and 78, a motor M is fixed. In conjunction therewith, a rotary shaft 84, on which a drive gear 83 meshes with a gear 82 fixed to a drive shaft of the motor M, is fixed at the inner end portion.

On an arm support shaft 85 transversely extending between the upper end portions of the side plates 75, 75, upper end portions of a pair of pivotal arms 87, 87 pivotably supporting the side plates 63, 63 of the seedling holding mechanism H via shafts 86, 86 at the lower end thereof, are pivotably supported. On a connecting member 88 transversely extending between a pair of pivotal arms 87, 87, a bracket 89 is provided at the center portion thereof. To the bracket 89 and an eccentric shaft 83a of the drive gear 83, both ends of the connecting rod 90 is rotatably mounted.

As driving the eccentric shaft 83a of the drive gear 83 in forward and reverse direction between the drive starting position (h) and the drive terminating position (i), the pivotal arms 87 and 87 are pivoted for shifting the seedling holding mechanism H between the seedling piercing position (f) and the seedling release position (g).

At the center portion of the support shaft 81, a small gear 82 meshing with the drive gear 83 is fixed. Also, on the brackets 80, 80 provided on both ends of the support shaft 81, the upper end portion of support arms 93, 93 pivoting the side plates 63, 63 of the seedling holding mechanism H, are mounted via a shaft 92 which is provided between the lower end portions between the brackets 80, 80.

According to rotation of the drive gear 83, the eccentric shaft 83a is moved from the drive starting position (h) to the drive terminating position (i) to cause upward pivotal movement of the brackets 80, 80. By this, on the side plates 63, 63 of the seedling holding mechanism H, a force for upwardly pivoting about the shaft 86 of the pivotal arms 87, 87 acts. As a result, the seedling holding mechanism H is upwardly pivoted over 90° about the shaft 86 so that the seedling holding needles 38 is oriented in substantially horizontal direction. With maintaining this attitude, the seedling holding mechanism H is moved to the seedling release position (g).

By driving the motor M in the reverse direction, the seedling holding mechanism H is returned from the seedling release position (g) to the seedling piercing direction (f) through the reversed path.

The transporting conveyer D is supported about a tray space SP defined on the front end portion of a pair of left and right side plates 12 and 13, at the upper end portion of the machine frame 11. On the transportation terminating end, a vertical conveyer 94 transporting the seedling P toward seedling planting rings 9, 9, is provided (FIG. 1).

After completion of piercing of the seedling P, the seedling pushing rod 60 is returned to the pushing stand-by position (e). Then, the seedling holding mechanism H is shifted from the seedling piercing position (f) to the seedling release position (g). During this, the seedling holding mechanism H is pivoted over 90° about the shaft 86.

Once the seedling holding mechanism H is shifted to the seedling release position (g), the fluid pressure cylinder 73 of the seedling holding mechanism H is driven to expand the drive rod to abruptly retract the seedling holding needle 38 between the side plates 63, 63.

By the retracting operation, each seedling P pierced by the seedling holding needle 38 is released by the seedling release plate 74. Thus, the seedling is released on the outfeeding conveyer D located at the lower position. The seedling P released on the outfeeding conveyer D is subsequently transferred to the vertical conveyer 94 and transported toward the seedling planting ring 9.

In conjunction with releasing of the seedling P, the seedling holding mechanism H is moved to return to the seedling piercing position (f), and the seedling pushing rod 60 of the seedling pushing mechanism I is returned to the pushing stand-by position (e). Then, the seedling tray T is intermittently transported to place the next row of the cells at the seedling pick-up position (a).

Thus, once picking up of the seedling P stored in the preceding seedling tray T is completed, the seedling P stored in the following seedling tray T is picked up in the same manner.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, while the foregoing embodiment has been discussed in the construction, in which the tray positioning rod is inserted into a part of the seedling storage cells in the row or rows, embodiments may have structures other than the row of the cells, to which the seedling pushing rods are about inserted. However, the positioning may be done in the following manner.

Figure 20:
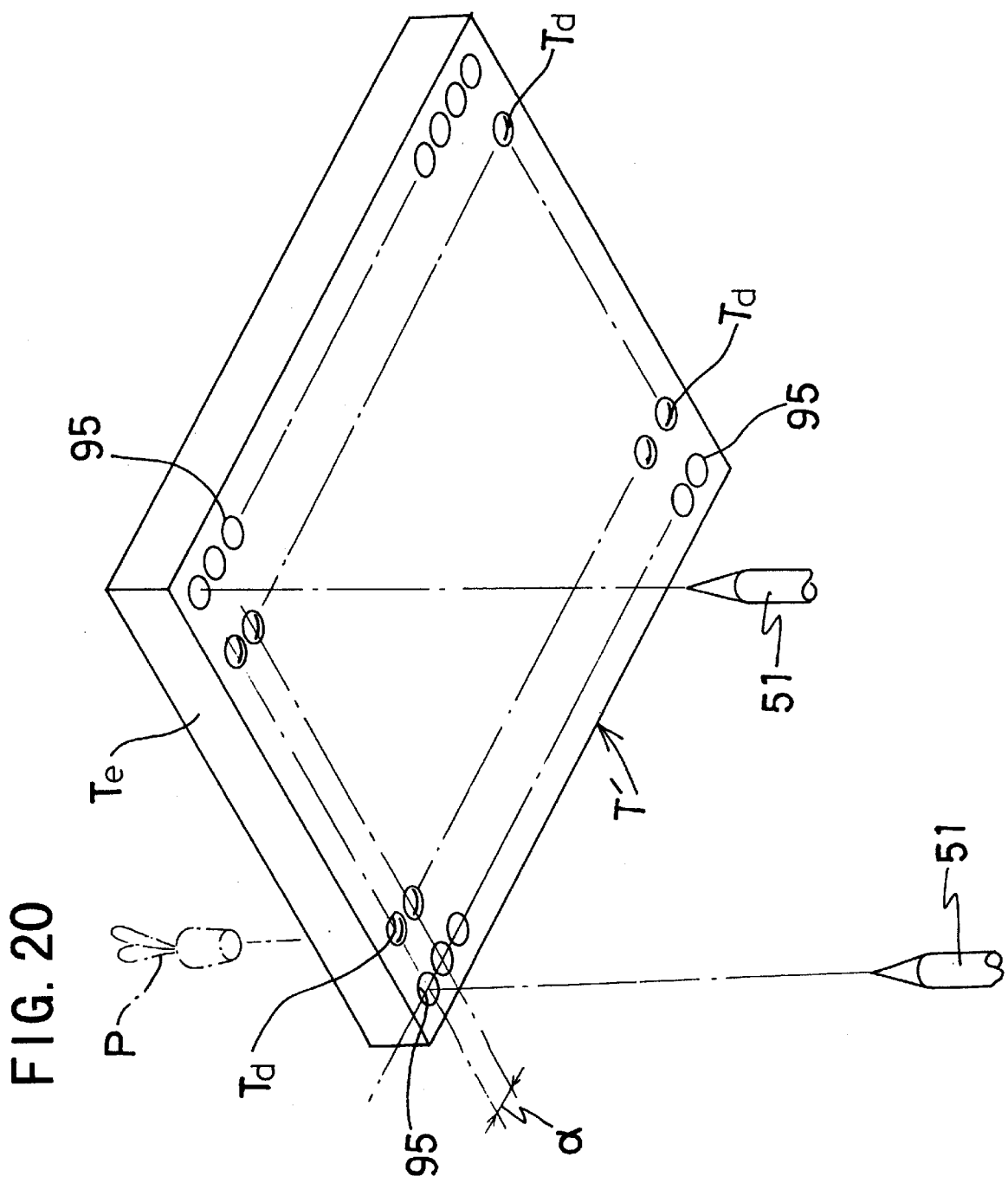
FIG. 20 is a perspective view of the seedling tray formed with a positioning rod insertion hole.
Figure 21:
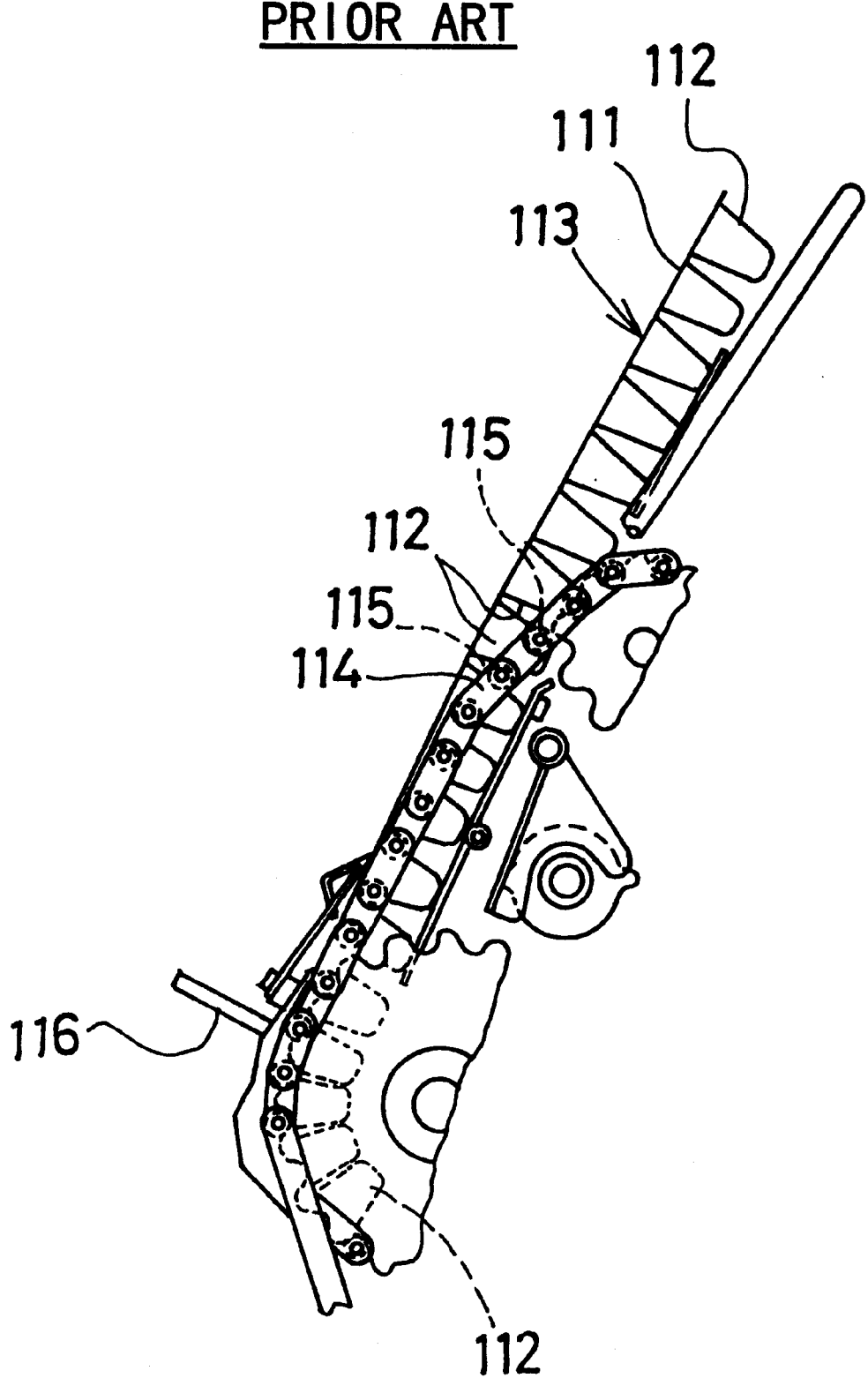
FIG. 21 is a side elevation of the major part of the conventional transporting device of the seedling tray.

A seedling tray T' shown in FIG. 20 is formed with a plurality of positioning rod insertion holes 95 . . . in both side portions of the bottom surface. In parallel to the transporting direction β of the seedling tray T' and with an interval consistent with the arrangement pitch α of the cells Ta . . . , the positioning rod insertion holes 95 . . . are aligned.

The positioning rod insertion hole 95 may be the same shape as the cell Ta, or, in the alternative, the positioning rod insertion hole 95 may be formed in recessed manner in the bottom surface so that it may not be seen from the upper surface of the seedling tray T'.

A plurality of positioning rod insertion holes 95 . . . are formed in both side portions of the bottom surface of the seedling tray T' in parallel to the transporting direction β of the seedling tray T' and in alignment in a pitch corresponding to the arrangement pitch α of the cells Ta . . . , the arranging position of the tray positioning rods 51, 51 of the seedling pushing mechanism I, the seedling tray T' can be transported only by arranging pairs of left and right rod insertion holes 95, 95 at an interval for placing the rod insertion holes in opposition to the tray positioning rods 51, 51.

It should be noted that a plurality of positioning rod insertion holes 95 . . . is not limited to those formed in the pitch corresponding to the arrangement pitch α of the cells Ta . . . but can be any necessary interval. In this case, by setting the interval of the positioning rod insertion holes in 1/n (n is integer) of the arrangement pitch α of the cells Ta . . . , the seedling tray T' can be easily transported.

In the foregoing embodiment, discussion has been given for an example that the tray positioning rods are inserted into two cells in the same row, but the present invention should not be limited to the shown construction. It is possible to position the seedling tray by inserting two tray positioning rods into the cells in different rows. Furthermore, the number of the tray positioning rods is not specified limited to two but can be three or more for positioning the seedling tray.

What is claimed is:

1. A method for picking up seedlings from a seedling tray by inserting seedling pushing rods into rod insertion holes formed in bottoms of respective seedling storage cells formed in rows and formed in alignment at a predetermined pitch in said seedling tray being transported in one direction, said method comprising the steps of:
    positioning said seedling tray at a predetermined position by means of tray positioning rods wherein said tray positioning rods position said seedling tray by moving in a direction perpendicular to said one direction of said seedling tray; and
    inserting said seedling pushing rods while maintaining said seedling tray in a positioned condition.

2. A method for picking up seedlings from a seedling tray as set forth in claim 1, wherein said tray positioning rods are inserted into some of said seedling storage cells in a row other than a row of the seedling storage cells, to which said seedling pushing rods are inserted.

3. A method for picking up seedlings from a seedling tray as set forth in claim 1, wherein said seedling tray is positioned by inserting said tray positioning rods into some of said seedling storage cells in Nth row and said seedling pushing rods are inserted into said seedling storage cells in (N+1)th row.

4. A method for picking up seedlings from a seedling tray as set forth in claim 2, wherein said seedling tray is positioned by inserting said tray positioning rods into some of said seedling storage cells in Nth row, said tray positioning rods being moved in a magnitude corresponding to an arrangement pitch of said seedling storage cells, toward downstream in a transporting direction of said seedling tray while maintaining a condition of said tray positioning rods being inserted into some of said seedling storage cells, and said seedling pushing rods being inserted into respective said seedling storage cells in (N+1)th row.

5. A method for picking up seedlings from a seedling tray as set forth in claim 2, wherein said seedling tray is positioned by abutting said tray positioning rods to a front end face of said seedling tray, said seedling pushing rods being inserted into respective of said seedling storage cells in a Nth row for picking up a seedling stored therein, said seedling tray being positioned by inserting said tray positioning rods into some of said seedling storage cells in Nth row, said tray positioning rods being moved in a magnitude corresponding to an arrangement pitch of said seedling storage cells, toward downstream in a transporting direction of said seedling tray while maintaining the condition where said tray positioning rods are inserted into some of said seedling storage cells, and said seedling pushing rods are inserted into respective said seedling storage cells in (N+1) th row.

6. A method for picking up seedlings from a seedling tray as set forth in claim 1, wherein a plurality of tray positioning holes are formed in said seedling tray, said tray positioning rods are in alignment at predetermined intervals, and wherein said seedling tray is positioned by inserting said tray positioning rods in said tray positioning holes.

7. A method for picking up seedlings from a seedling tray as set forth in claim 6, wherein said tray positioning rods are shifted in a magnitude corresponding to the arrangement pitch of said seedling storage cells along a downstream side of a transporting direction of said seedling tray while maintaining a condition where said tray positioning rods are inserted in some of said tray positioning holes, so as to facilitate insertion of said seedling pushing rods into said seedling storage cells.

8. A method for picking up seedlings from a seedling tray as set forth in claim 1, wherein seedling holding needles are downwardly shifted into said seedling storage cells from upper surface openings thereof, for piercing and holding said seedlings stored in said seedling storage cells by said seedling holding needles, said seedling pushing rods being elevated upwardly to abut onto the bottom surface of a pierced seedling and held by said seedling holding needles under pressure for pushing up the pierced seedling by elevating said seedling holding needles and said seedling pushing rods at the same speed.

9. A method for picking up seedlings from a seedling tray as set forth in claim 2, wherein seedling holding needles are downwardly shifted into said seedling storage cells from upper surface openings thereof, for piercing and holding said seedlings stored in said seedling storage cells by said seedling holding needles, said seedling pushing rods being elevated upwardly to abut onto the bottom surface of a pierced seedling and held by said seedling holding needles under pressure for pushing up the seedling by elevating said seedling holding needles and said seedling pushing rods at the same speed.

10. A method for picking up seedlings from a seedling tray as set forth in claim 4, wherein seedling holding needles are downwardly shifted into said seedling storage cells from upper surface openings thereof for piercing and holding said seedlings stored in said seedling storage cells by said seedling holding needles, said seedling pushing rods being elevated upwardly to abut onto the bottom surface of a pierced seedling and held by said seedling holding needles under pressure for pushing up the seedling by elevating said seedling holding needles and said seedling pushing rods at the same speed.

11. A method for picking up seedlings from a seedling tray as set forth in claim 6, wherein seedling holding needles are downwardly shifted into said seedling storage cells from upper surface openings thereof for piercing and holding said seedlings stored in said seedling storage cells by said seedling holding needles, said seedling pushing rods being elevated upwardly to abut onto the bottom surface of a pierced seedling and held by said seedling holding needles under pressure for pushing up the seedling by elevating said seedling holding needles and said seedling pushing rods at the same speed.

12. A method for picking up seedlings from a seedling tray as set forth in claim 11, wherein said tray positioning rods are shifted in a magnitude corresponding to the arrangement pitch of said seedling storage cells along a downstream side of a transporting direction of said seedling tray while maintaining a condition of said tray positioning rods being inserted in some of said tray positioning holes, and wherein insertion of said seedling pushing rods into said seedling storage cells is performed.

13. A device for picking up seedlings from a seedling tray, the seedlings being picked up per each row of seedling storage cells formed in alignment at a predetermined pitch in said seedling tray being transported in one direction, said device comprising:

a tray positioning rod for positioning said seedling tray from which the seedlings stored in said respective seedling storage cells are to be picked up; and seedling pushing rods performing an insertion operation for said seedling storage cells while maintaining a condition wherein said seedling tray is positioned at a predetermined position by said tray positioning rod wherein said tray positioning rod positions said seedling tray by moving in a direction perpendicular to said one direction of said seedling tray.

14. A device for picking up seedlings from a seedling tray, the seedlings being picked up per each row of seedling storage cells formed in alignment at a predetermined pitch in said seedling tray being transported in one direction, said device comprising:

a tray positioning rod being inserted into some of said seedling storage cells in a first row, seedling pushing rods being inserted in a second row, said tray positioning rod positioning said seedling tray having the seedlings stored in said respective seedling storage cells to be picked up; and said seedling pushing rods performing an insertion operation for said respective seedling storage cells while maintaining a condition wherein said seedling tray is positioned at a predetermined position by inserting said tray positioning rod into some of said seedling storage cells.

15. A device for picking up seedlings from a seedling tray, the seedlings being picked up per each row of seedling storage cells formed in alignment at a predetermined pitch in said seedling tray transported in one direction, said device comprising:

a tray positioning rod being inserted into some of said seedling storage cells in a Nth row, for positioning said seedling tray in which the seedlings stored in said respective seedling storage cells are to be picked up; and seedling pushing rods performing an insertion operation for said respective seedling storage cells in (N+1)th row while maintaining a condition wherein said seedling tray is positioned at a predetermined position by inserting said tray positioning rod into some of said seedling storage cells in said Nth row.

16. A device for picking up seedlings from a seedling tray as set forth in claim 14, which further comprises a tray transporting device intermittently transporting said seedling tray by shifting in a magnitude corresponding to an arrangement pitch of said seedling storage cells toward a downstream side in the transporting direction of said seedling tray while maintaining a condition wherein said tray positioning rod is inserted into some of said seedling storage cell in said seedling tray.

17. A device for picking up seedlings from a seedling tray as set forth in claim 15, which further comprises a tray transporting device intermittently transporting said seedling tray by shifting in a magnitude corresponding to an arrangement pitch of said seedling storage cells toward a downstream side in the transporting direction of said seedling tray while maintaining a condition wherein said tray positioning rod is inserted into some of said seedling storage cell in said seedling tray.

18. A device for picking up seedlings from a seedling tray as set forth in claim 14, wherein said tray position rod and said seedling pushing rods are arranged with an interval corresponding to the arrangement pitch of said seedling storage cells.

19. A device for picking up seedlings from a seedling tray as set forth in claim 15, wherein said tray position rod and said seedling pushing rods are arranged with an interval corresponding to the arrangement pitch of said seedling storage cells.

20. A device for picking up seedlings from a seedling tray as set forth in claim 17, wherein said tray position rod and said seedling pushing rods are arranged with an interval corresponding to the arrangement pitch of said seedling storage cells.

21. A device for picking up seedlings from a seedling tray as set forth in claim 14, wherein said tray positioning rod and said seedling pushing rods are simultaneously shifted while maintaining a constant interval therebetween in the transporting direction of said seedling tray, and shifted in a vertical direction independently of each other.

22. A device for picking up seedlings from a seedling tray as set forth in claim 15, wherein said tray positioning rod and said seedling pushing rods are simultaneously shifted while maintaining a constant interval between each other in the transporting direction of said seedling tray, and shifted in a vertical direction independently of each other.

23. A device for picking up seedlings from a seedling tray as set forth in claim 17, wherein said tray positioning rod and said seedling pushing rods are simultaneously shifted while maintaining a constant interval between each other in the transporting direction of said seedling tray, and shifted in a vertical direction independently of each other.

24. A device for picking up seedlings from a seedling tray as set forth in claim 18, which further comprises two link mechanisms supporting said tray positioning rod and said seedling pushing rods in a vertically movable fashion independently of each other, a seedling pushing mechanism provided in each of said two link mechanisms and constituted of a fluid pressure cylinder, and a tray transporting driving portion reciprocally shifting said seedling pushing mechanism at a same pitch as the arrangement pitch of said seedling storage cells in the transporting direction of said seedling tray.

25. A device for picking up seedlings from a seedling tray as set forth in claim 19, which further comprises two link mechanisms supporting said tray positioning rod and said seedling pushing rods in a vertically movable fashion independently of each other, a seedling pushing mechanism provided in each of said two link mechanisms and constituted of a fluid pressure cylinder, and a tray transporting driving portion reciprocally shifting said seedling pushing mechanism at a same pitch as the arrangement pitch of said seedling storage cell in the transporting direction of said seedling tray.

26. A device for picking up seedlings from a seedling tray as set forth in claim 14, wherein said tray positioning rod is arranged at a position opposing a seedling storage cell which is arranged at an outside edge of a row of said seedling storage cells.

27. A device for picking up seedlings from a seedling tray as set forth in claim 15, wherein said tray positioning rod is arranged at a position opposing a seedling storage cell which is arranged at an outside edge of a row of said seedling storage cells.

28. A device for picking up seedlings from a seedling tray as set forth in claim 17, wherein said tray positioning rod is arranged at a position opposing a seedling storage cell which is arranged at an outside edge of a row of said seedling storage cells.

29. A device for picking up seedlings from a seedling tray as set forth in claim 25, wherein said tray positioning rod is arranged at a position opposing a seedling storage cell which is arranged at an outside edge of a row of said seedling storage cells.

30. A device for picking up seedlings from a seedling tray, the seedlings being picked up per each row of seedling storage cells formed in alignment at a predetermined pitch in said seedling tray transported in one direction, said device comprising:

- a plurality of positioning rod insertion holes formed in said seedling storage cells of said seedling tray in parallel to a transporting direction of said seedling tray and in alignment with a predetermined interval;
- tray positioning rods inserted into some of said positioning rod insertion holes for positioning said seedling tray; and
- seedling pushing rods performing an insertion operation for said seedling storage cells while maintaining a condition wherein said tray position rods are inserted into some of said positioning rod insertion holes for positioning.

31. A device for picking up seedlings from a seedling tray as set forth in claim 17, which further comprises a tray transporting device intermittently transporting said seedling tray by shifting in a magnitude corresponding to an arrangement pitch of said seedling storage cells toward a downstream side in the transporting direction of said seedling tray while maintaining the condition where said tray positioning rods are inserted into some of said positioning rod insertion holes.

32. A device for picking up seedlings from a seedling tray as set forth in claim 30, wherein said positioning rod insertion holes are formed in alignment with an interval corresponding to the arrangement pitch of said seedling storage cells.

33. A device for picking up seedlings from a seedling tray, the seedlings being picked up per each row of seedling storage cells formed in alignment at a predetermined pitch in said seedling tray transported in one direction, said device comprising:

- a plurality of positioning rod insertion holes formed in said seedling tray in parallel to a transporting direction of said seedling tray and in alignment with a predetermined interval;
- tray positioning rods inserted into some of said positioning rod insertion holes for positioning said seedling tray; and
- seedling pushing rods performing an insertion operation for said seedling storage cells while maintaining a condition wherein said tray position rods are inserted into some of said positioning rod insertion holes for positioning,
- wherein said positioning rod has a tip end portion formed into a cone shaped configuration, and an intermediate portion adjacent to said tip end portion, wherein said intermediate portion has an external diameter matching with an internal diameter of one of said positioning rod insertion holes.

* * * * *